Patented May 8, 1934

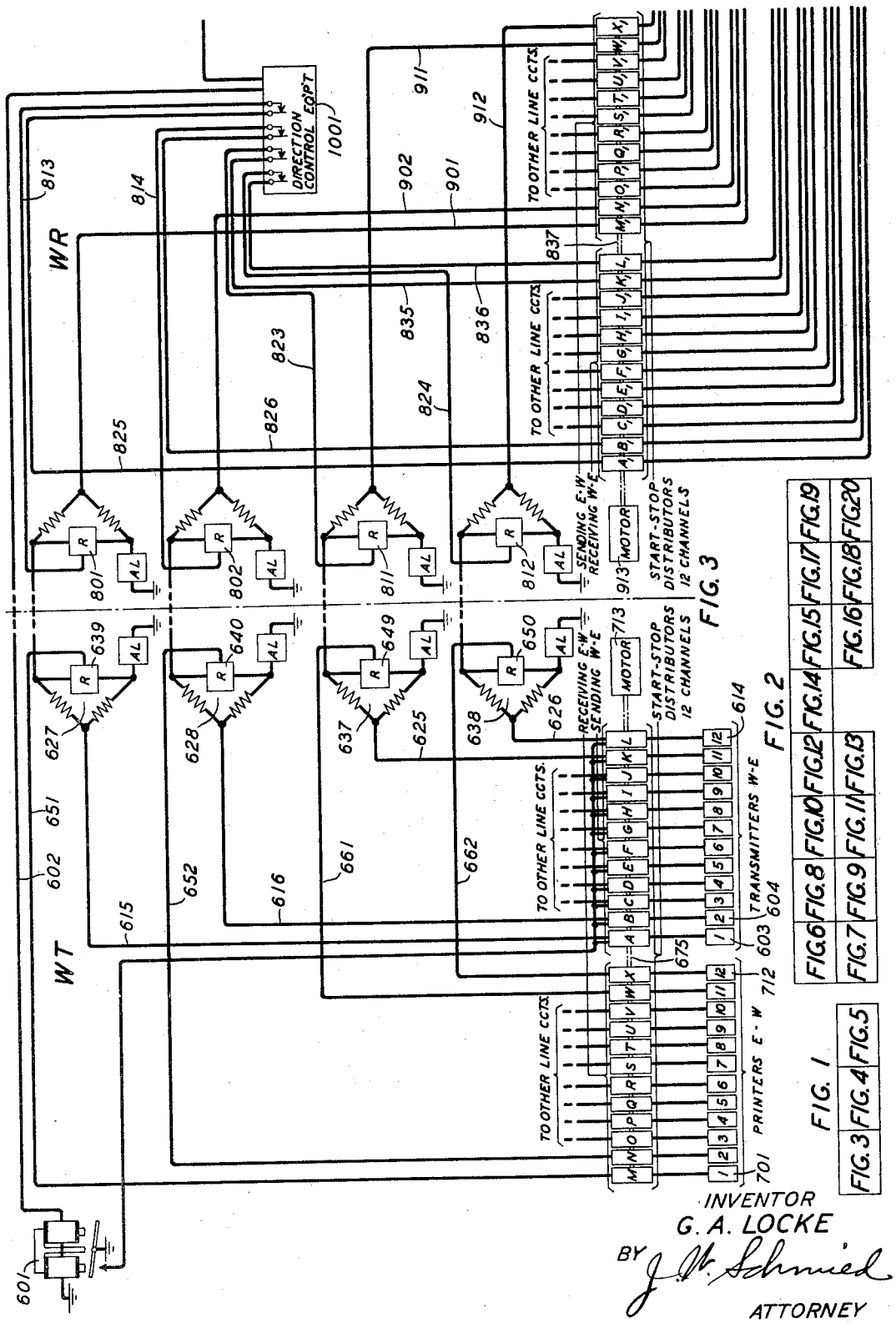

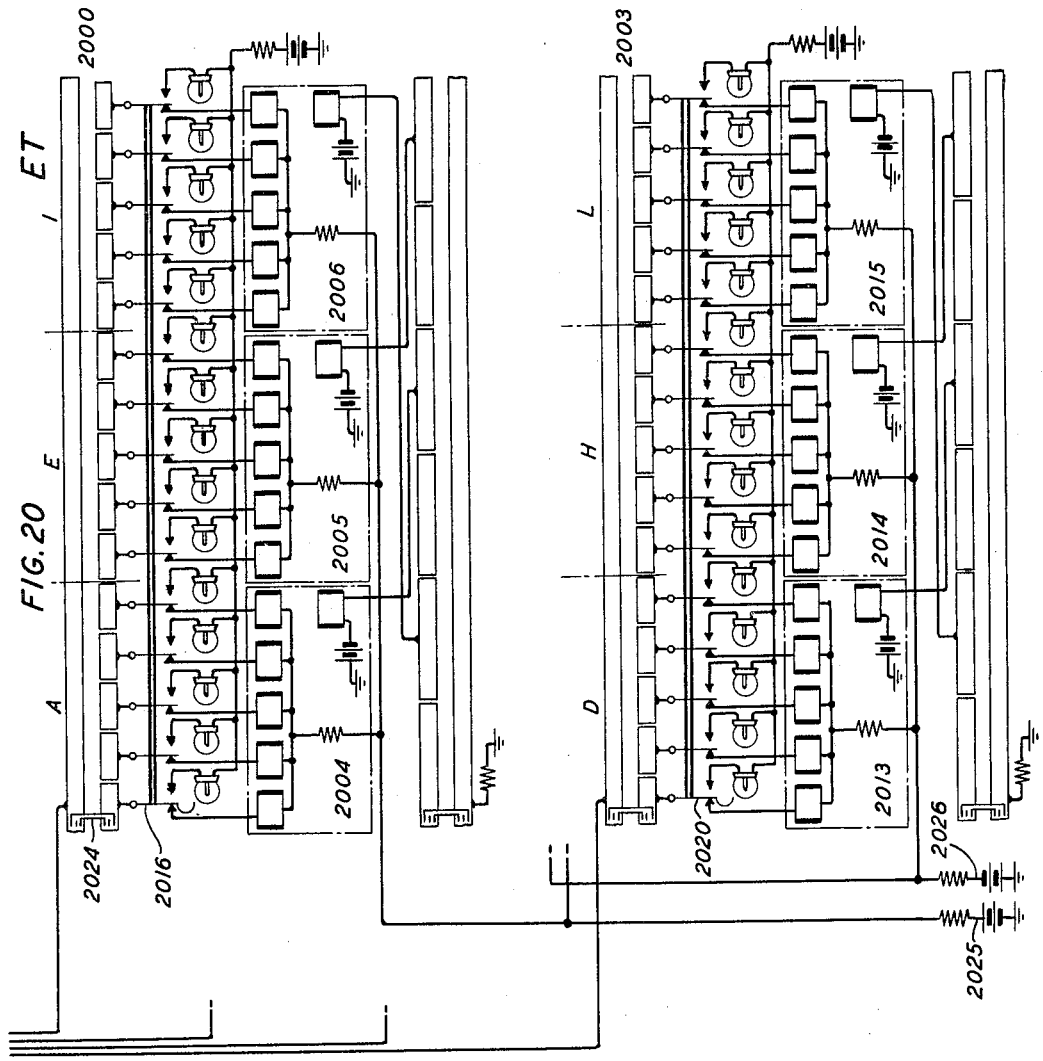

1,957,502

UNITED STATES PATENT OFFICE 1,957,502

MULTIPLEX TELEGRAPH SYSTEM

George A. Locke, Glenwood, N. Y., assignor to Bell Telephone Laboratories, Incorporated, New York, N. Y., a corporation of New York Application December 12, 1930, Serial No. 501,788

6 Claims. (Cl. 178—53)

This invention relates to impulse transmission systems and more particularly to long submarine cable multiplex telegraph systems.

A general object of this invention is to improve the operation of a multiplex signaling system of the type adapted for use with submarine cables and a specific object is to adapt a submarine cable system for operation with a land line system employing a plurality of start-stop distributor sets.

Another object is to operate a plurality of start-stop distributor sets on a common shaft at a speed bearing a definite ratio to the speed of a multiplex distributor employed for transmitting signals over a submarine cable.

Still another object is to provide for the selection for operation of one or more of a plurality of start-stop distributor sets mounted on a common continuously rotating shaft.

Another object is to overcome the difficulties inherent in the differences of speeds between start-stop and multiplex distributors located at the same or different points of a signaling system.

Another object is to increase signal carrying capacity of terminal apparatus whereby advantage may be taken of the maximum possible speed of signaling over a submarine cable.

Modern long loaded submarine cables have electrical characteristics which permit signaling thereover at considerably greater speed than heretofore used on cables of equal length. However, at the higher ranges of operating speeds, the duplexing of such cables presents difficulties which have been avoided by employing the one-way method of transmission with periodic reversals of the direction of transmission. This method was employed in the systems which are disclosed in U. S. Patents 1,689,328, 1,799,214, and 1,823,354 respectively granted to A. M. Curtis on October 30, 1928, A. A. Clokey on April 7, 1931, and A. D. Dowd et al. on Sept. 15, 1931. The apparatus disclosed in the Curtis patent is arranged for five-channel operation and is capable of operating satisfactorily at a speed slightly in excess of 1600 characters per minute, and the arrangements disclosed in the patents granted to Clokey and Dowd et al. are each arranged for eight-channel operation, but the speed of operation capable of being attained in the Clokey arrangement is slightly in excess of 2400 characters per minute and that in the Dowd et al. arrangement is slightly in excess of 3200 characters per minute.

According to the present invention, the apparatus employed is arranged for twelve-channel operation and is capable of operating satisfactorily at a speed slightly in excess of 4300 characters per minute. In the accompanying drawings by way of example and illustration, five stations are employed, two terminal stations and three relay or repeating stations. The cable consists of two sections which are interconnected at one repeating station. The other two repeating stations are located at the ends of the cable. The use of these repeating stations at opposite ends of the cable is desirable since the terminal stations of the complete system are usually located at considerable distances from the landing places of the submarine cable. For transmission in one direction, say from west to east, the arrangement briefly is as follows: twelve rotary start-stop distributor sets at one terminal station, each comprising a transmitting and a receiving head, are respectively connected over individual duplex lines to twelve other distributor sets of the same type at a repeater station at one end of the submarine cable. The start-stop distributor sets at each of these stations are mounted on a common, continuously rotating shaft, the rotatable brushes on the distributor sets being set in motion only at such times, as when a character or letter is being transmitted or received over a set. Connected to each start-stop distributor set at the repeater station are two sets of storing relays, one for the receiving head and the other for the transmitting head. The relay sets associated with the receiving heads are connected to the sending rings of the multiplex distributor set and the relay sets associated with the sending head are connected to the receiving ring of the multiplex distributor set. The multiplex distributor set is arranged to transmit the signal impulses to the cable over twelve channels, the speed of transmission over the cable being 180 cycles per second. The speed of transmission over each of the duplex lines extending to the terminal station is therefore one-twelfth the speed of operation over the cable plus the starting and stopping impulses. At the opposite end of the first section of submarine cable, the signal impulses are received in a vacuum tube amplifier and repeated through a vacuum tube repeater directly to the second section of the submarine cable. Connected intermediate the amplifier and repeater is a local transmitting circuit which is arranged to be connected to any one channel on a second twelve-channel distributor set, and when connected causes signal impulses, incoming on the particular channel selected, to be suppressed so that the corresponding outgoing channel may be utilized by the locally transmitted impulses. This arrangement provides for dropping off channels at a repeater station. At the opposite end of the second section of submarine cable, signal impulses are received in a vacuum tube amplifier and impressed on a third twelve-channel distributor set. The signal impulses of each group of three channels are then repeated through separate sets of storing relays to one of four sets of multiplex distributors, each handling the impulses of three channels. The output of each three-channel distributor set is impressed on a retransmitting or sending-on relay which operates to repeat the signals over a duplex line to the other terminal station. The speed of transmission over each of the duplex lines arranged for three-channel operation, is 45 cycles per second or one-fourth of the speed of transmission on the cable. The signals received at the terminal station over each of the four duplex lines are reproduced and impressed on one of four other sets of three-channel distributors whereat they are distributed to a group of three printers connected to each of the three-channel distributor sets. For transmission in the opposite direction, say from east to west, the arrangement is the reverse of that just described except that sets of transmitters are used in place of the printers and that a separate set of repeater equipment is employed for east-west transmission at the repeater station intermediate the cable sections. The means for effecting the reversals in the direction of transmission, for inserting or interpolating impulses of the unit lengths which are lost in transmission over the cable, and for correcting for synchronism between the distributors at the repeater stations, are the same as those employed in the patent to Dowd et al. The speed of the start-stop distributor sets will be obtained from a driving motor through a set of gears in proper ratio to maintain the speed of the start-stop brushes in proper relation to the twelve-channel distributor sets.

Other objects and features will be found in the following description and appended claims when taken in conjunction with the drawings.

The drawings are as follows:

In general, Fig. 1 shows the arrangement of sheets of Figs. 3, 4 and 5 which constitute a schematic layout of the complete system.

Fig. 2 shows the arrangement of sheets of Figs. 6 to 20 which constitute a detailed layout of the system.

Figs. 3, 4 and 5 show the schematic diagram which comprises a terminal station WT at the west end of the system; a repeater station WR at the west end of a submarine cable; an intermediate repeater station IR interconnecting the two sections of the cable; a repeater station ER at the east end of the cable; and a terminal station ET at the east end of the system.

Figs. 19 and 20 show the equipment at station ET.

Figure 6:
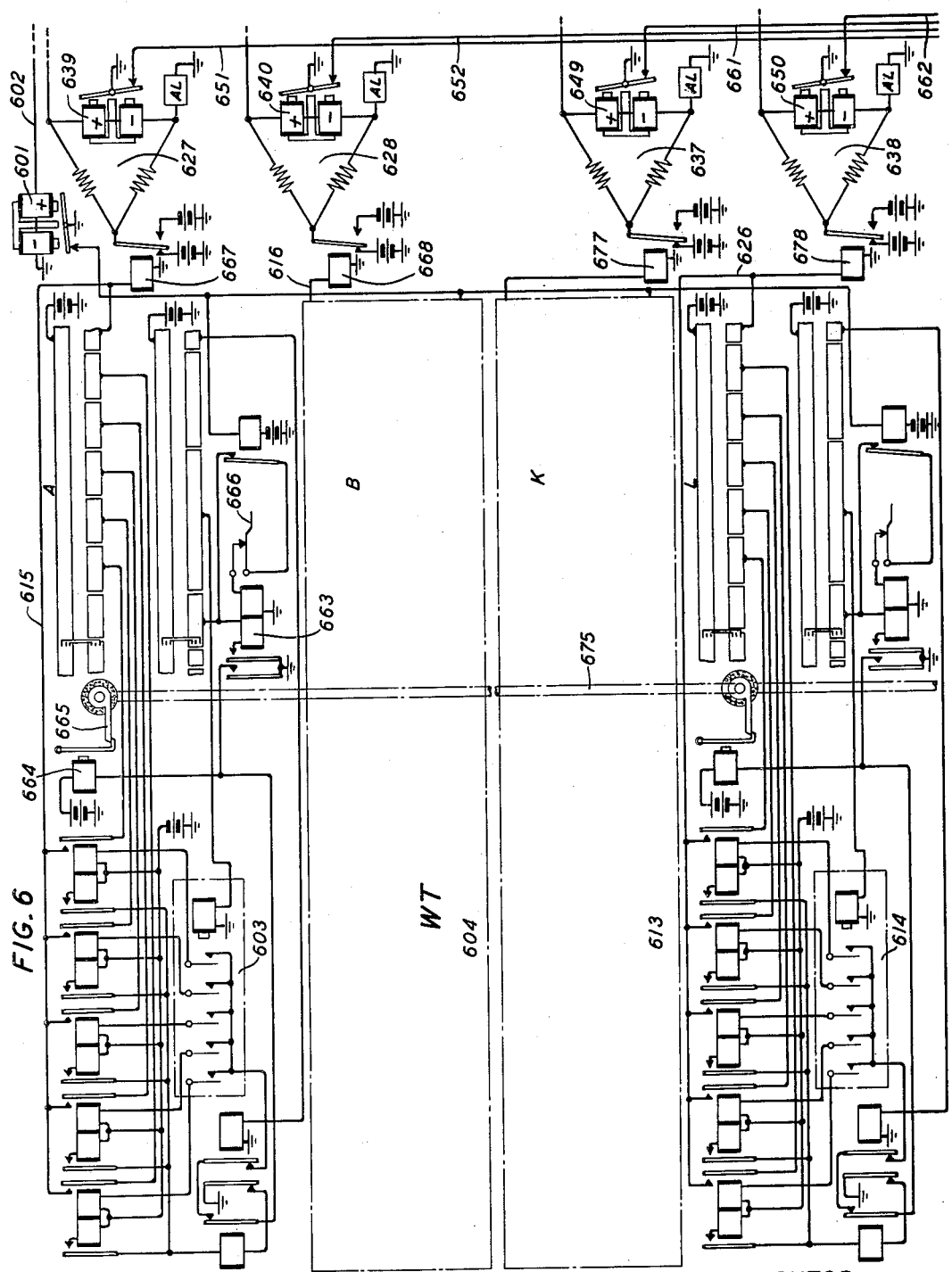
Figs. 6 and 7 show the equipment at the station WT.

More specifically, Fig. 6 shows the transmitters and the sending distributors of the start-stop type, of which there are twelve, working into individual duplex lines.

Figure 7:
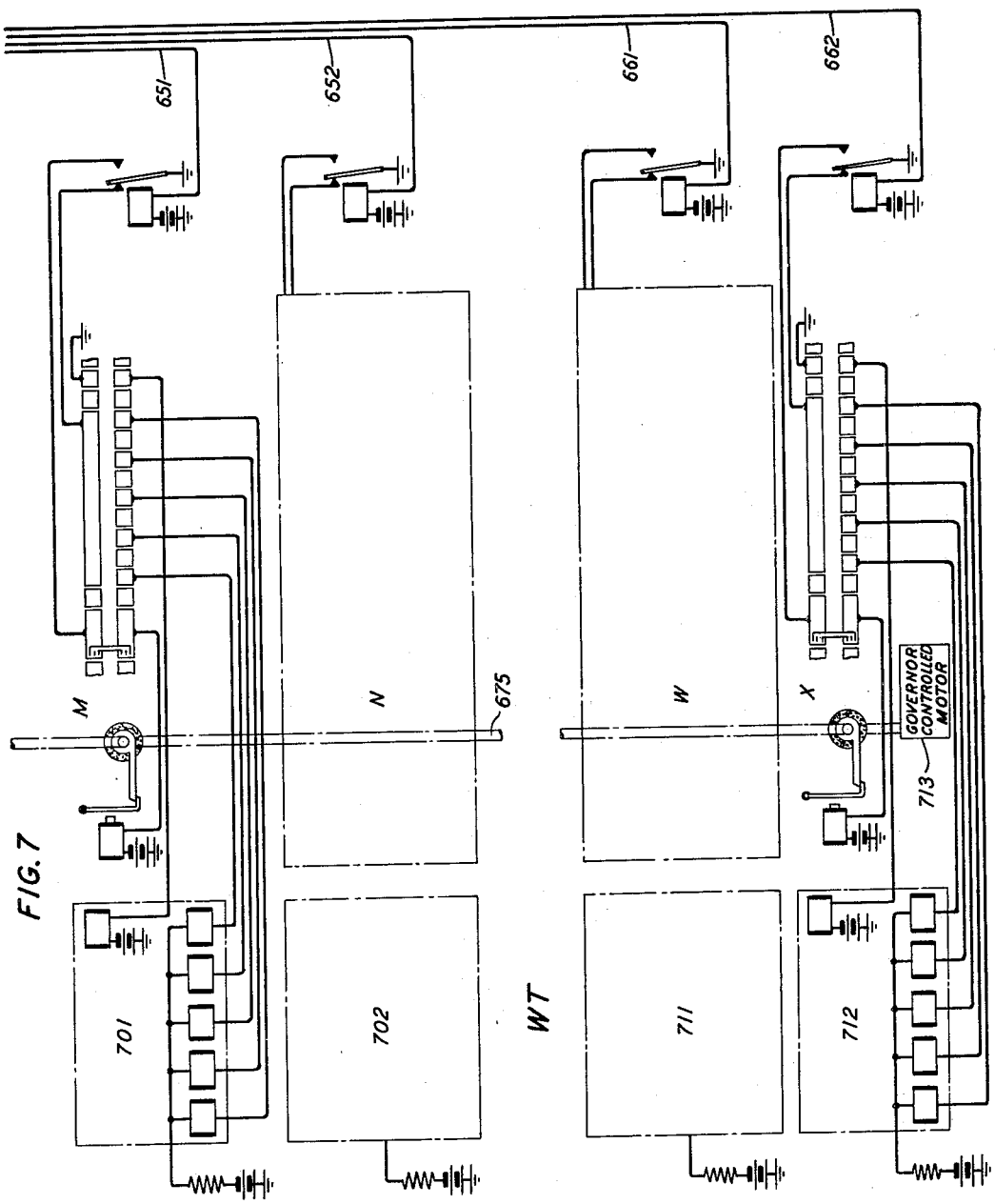

Fig. 7 shows the printers and the start-stop receiving distributors one of each being associated with each of the duplex lines shown in Fig. 6. These distributors are likewise of the start-stop type.

Figure 8:
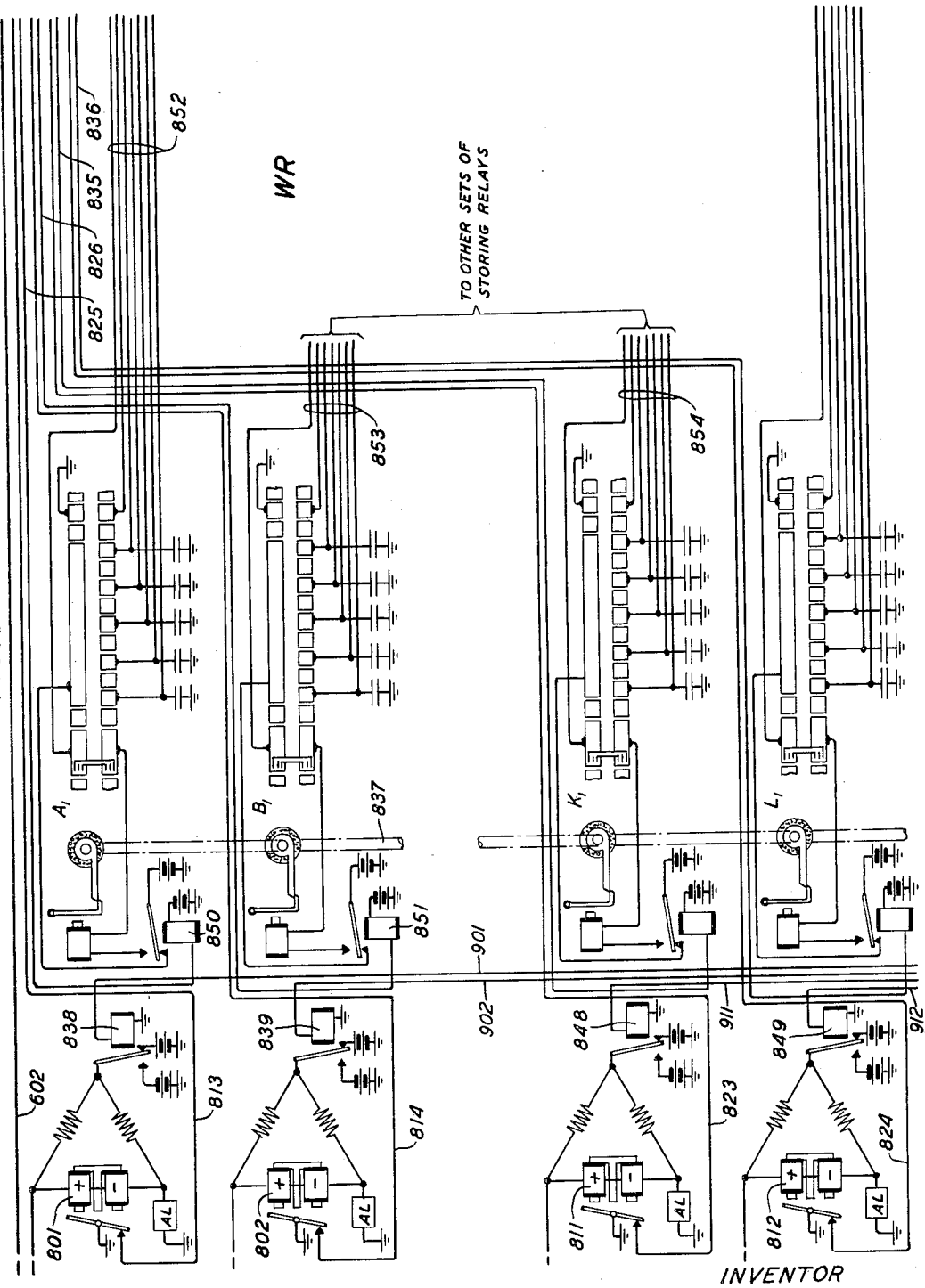
Figs. 8, 9, 10 and 11 show the equipment at the station WR.

Fig. 8 shows the duplex lines arranged to work in west-east transmission into start-stop receiving distributors at station WR, of which there are twelve to correspond to the sending distributors shown in Fig. 6.

Figure 9:
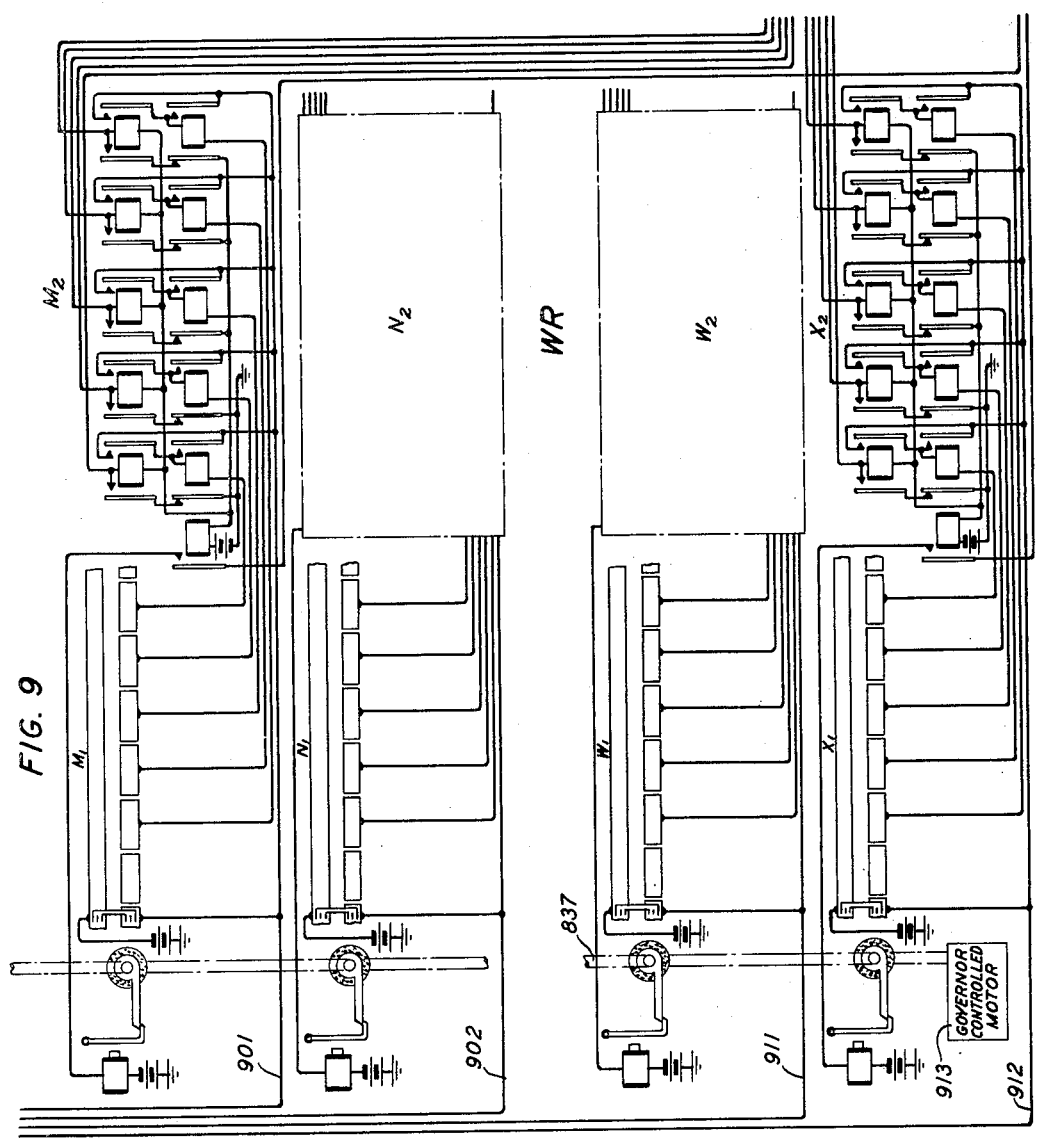

Fig. 9 shows the start-stop sending distributors each of which is arranged to work into one of the duplex lines in east-west transmission. Also one set of storing relays is shown for storing and sending the signals through each of the start-stop sending distributors to the duplex lines.

Figure 10:
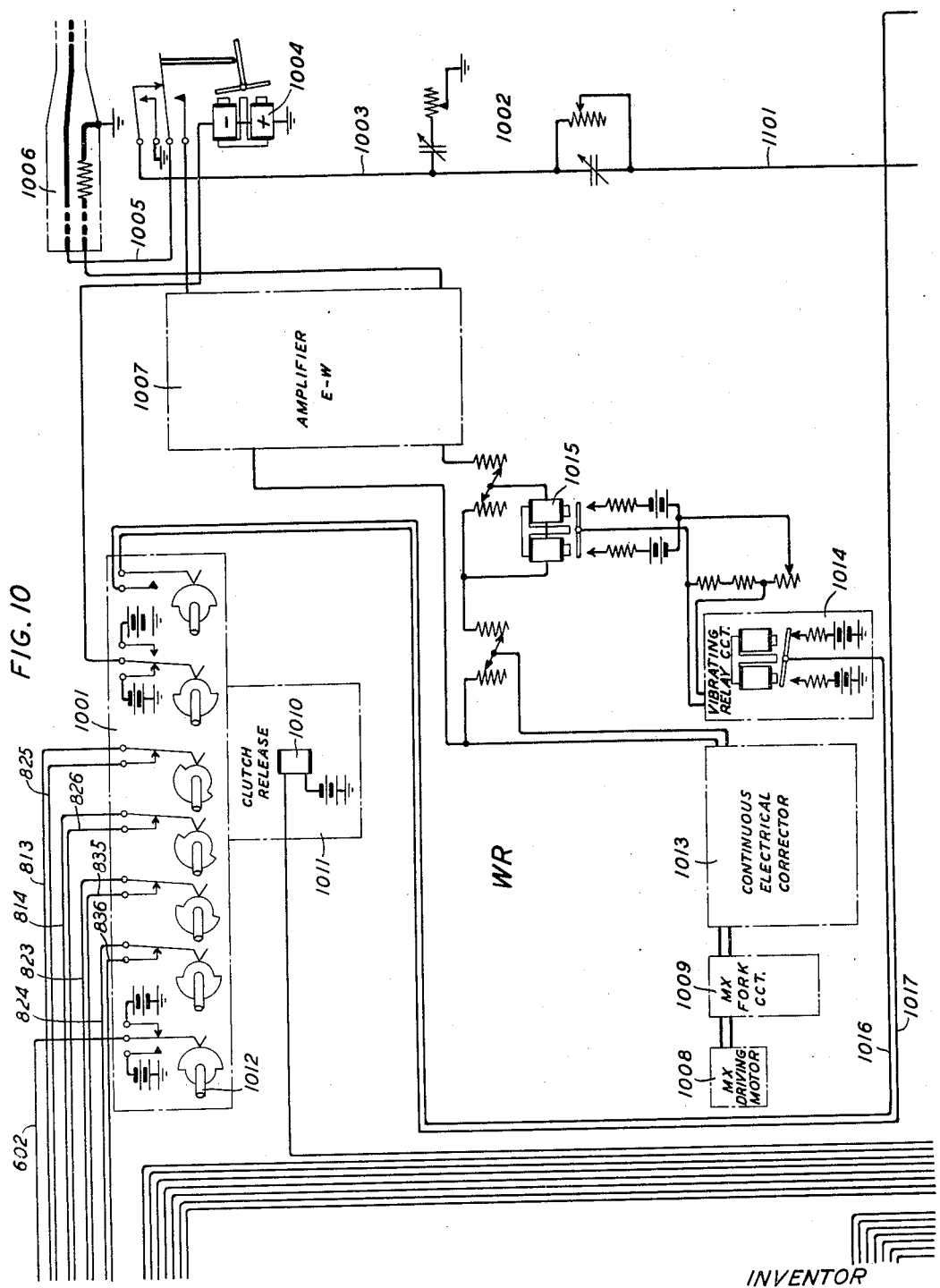

Fig. 10 shows the switching arrangement whereby the direction of transmission is reversed at predetermined intervals, and the receiving amplifier, the vibrating relay and the synchronizing circuits for east-west transmission.

Figure 11:
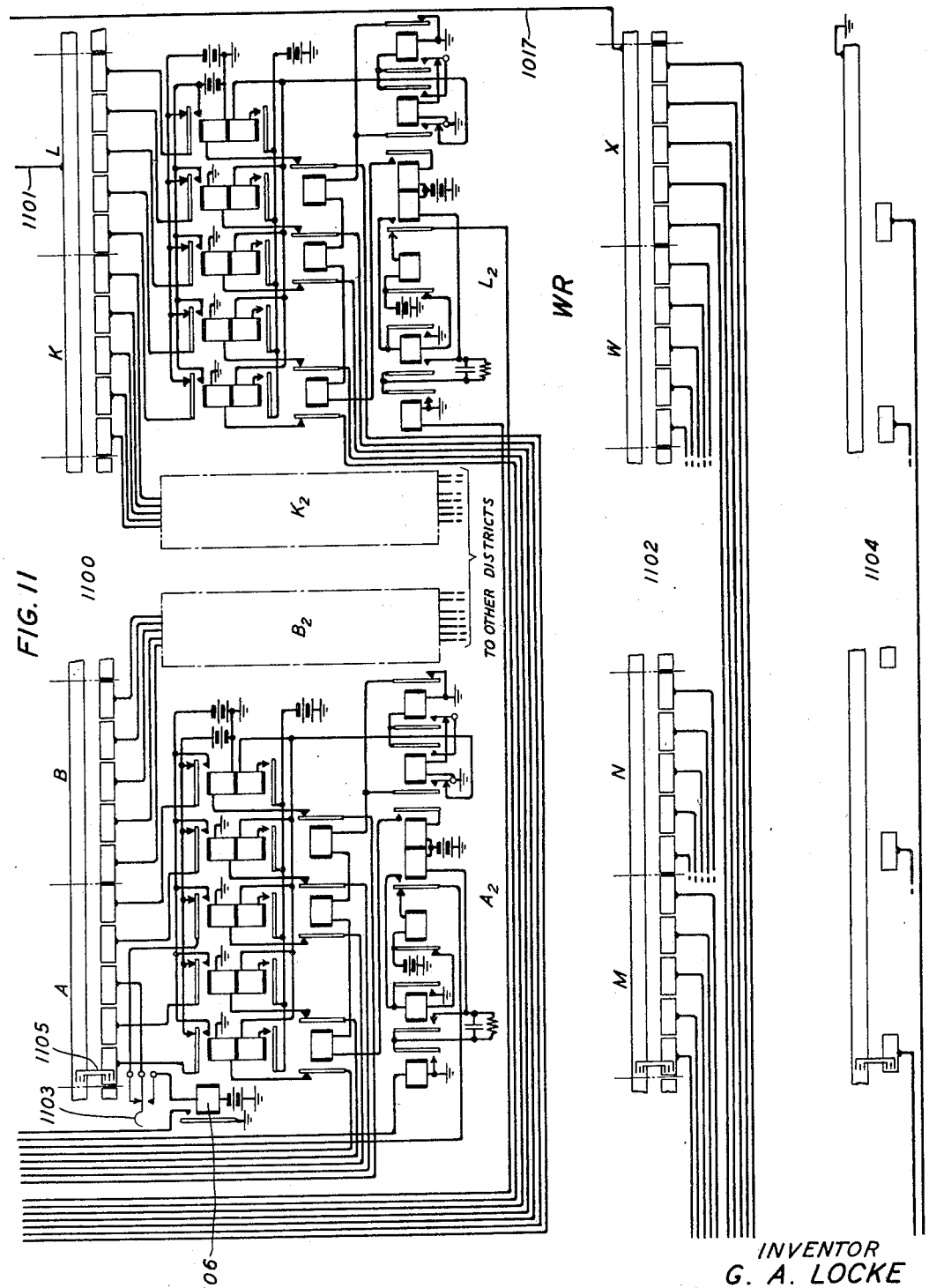

Fig. 11 shows the sending and the receiving sets of a twelve-channel multiplex rotary distributor. A set of storing relays is also shown for each of the sending channels, each set being connected directly to a start-stop receiving distributor shown in Fig. 8. The sending ring set is for west-east transmission and the receiving ring set is for east-west transmission.

Figure 12:
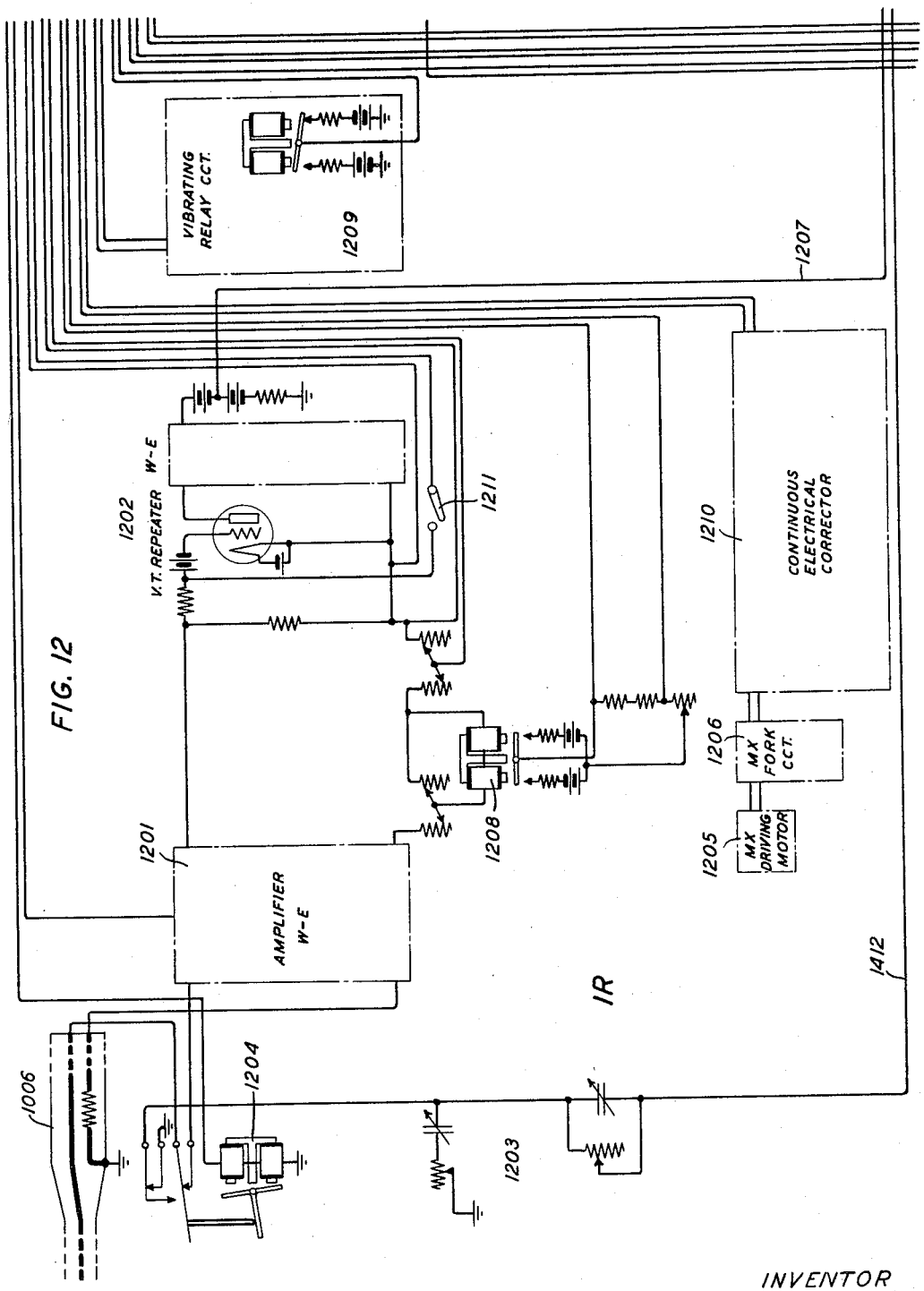
Figs. 12, 13 and 14 show the equipment at the station IR.

Fig. 12 shows the receiving amplifier, the vibrating relay and the synchronizing circuits and a vacuum tube repeater arranged to drop off certain channels at station IR in west-east transmission. The vibrating relay and the synchronizing circuits are common to transmission in both directions.

Figure 13:
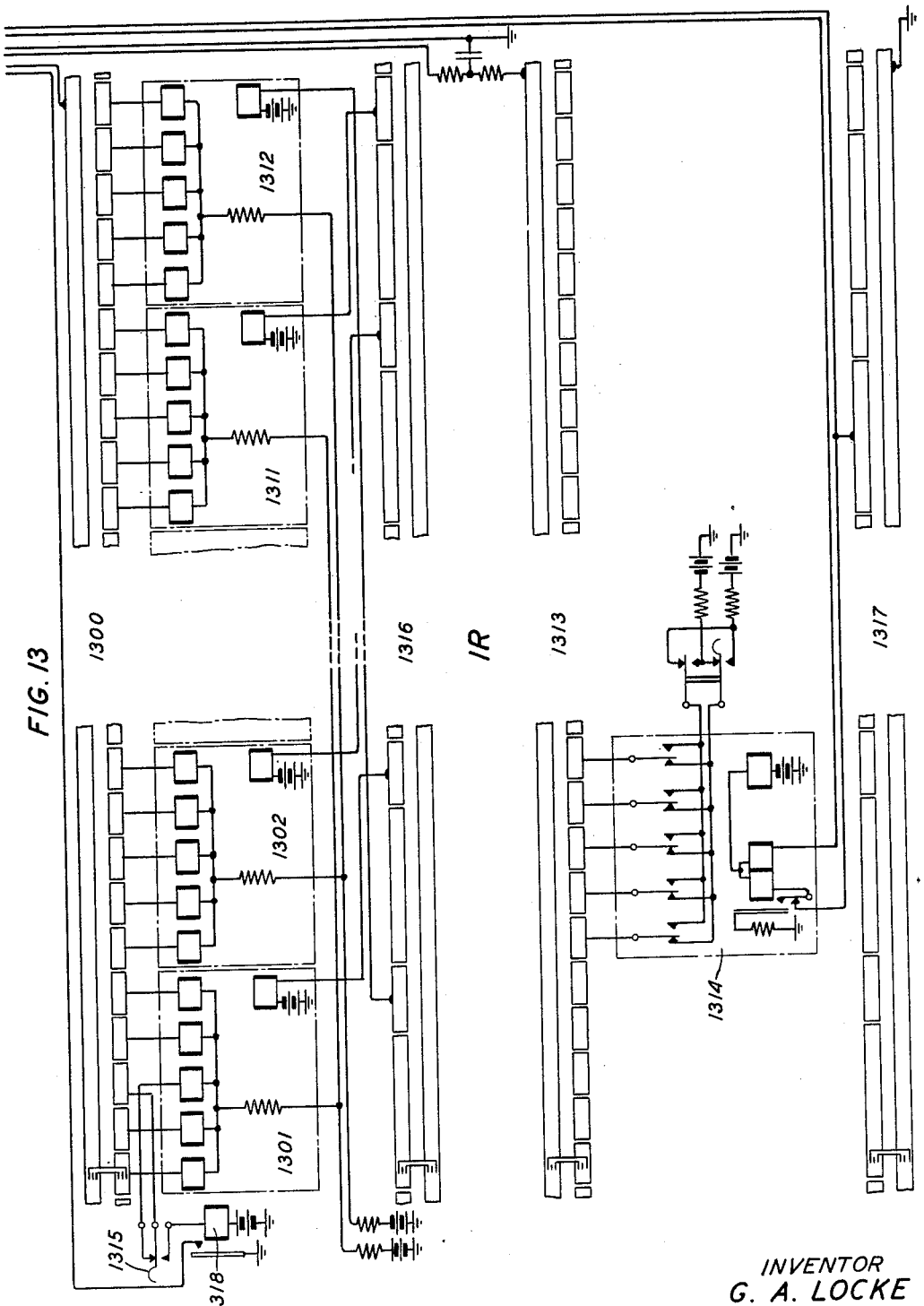

Fig. 13 shows a monitoring ring set and a plurality of printer sets associated therewith, and a floating transmitter, all of which are responsive to transmission in either a west-east or east-west direction.

Figure 14:
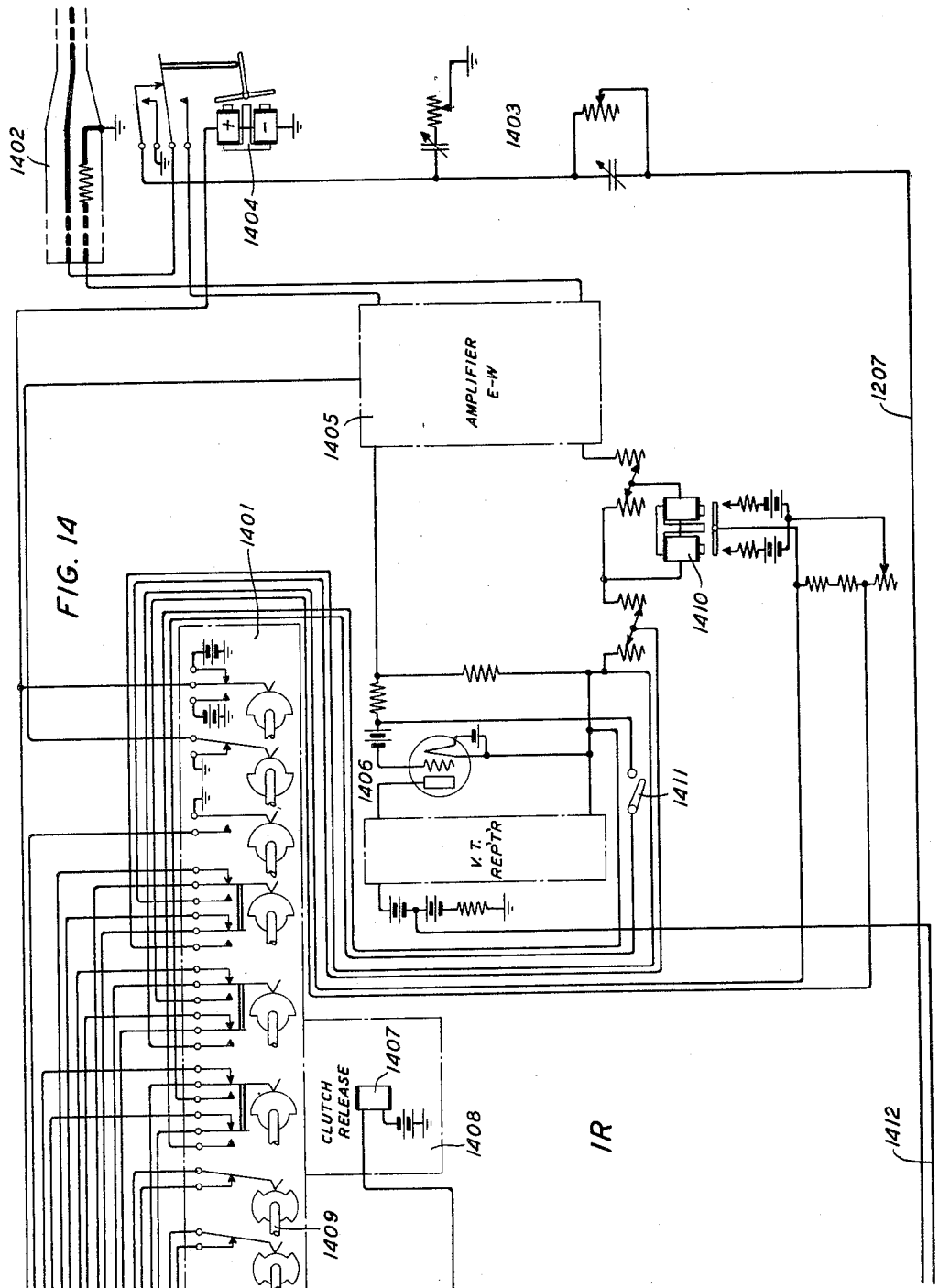

Fig. 14 shows the switching arrangement for reversing the direction of transmission at station IR, the receiving amplifier and vacuum tube repeater arranged for dropping off channels in east-west transmission.

Figure 15:
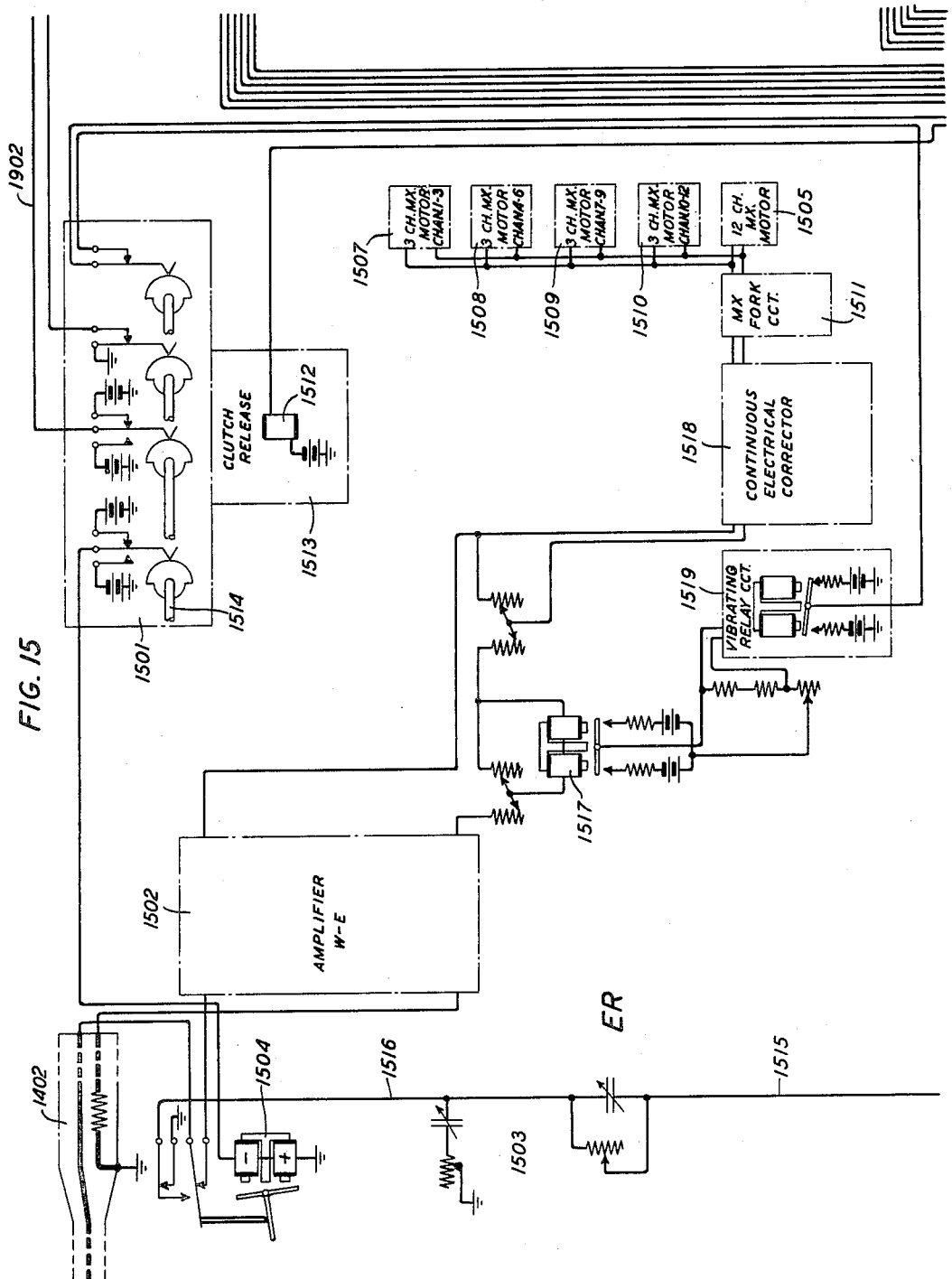
Figs. 15, 16, 17 and 18 show the equipment at the station ER.

Fig. 15 shows a switching arrangement for reversing the direction of transmission at both station ER and ET, the receiving amplifier, the vibrating relay and the synchronizing circuits for west-east transmission and the motors for respectively driving one twelve-channel and four three-channel multiplex rotary distributors.

Figure 16:
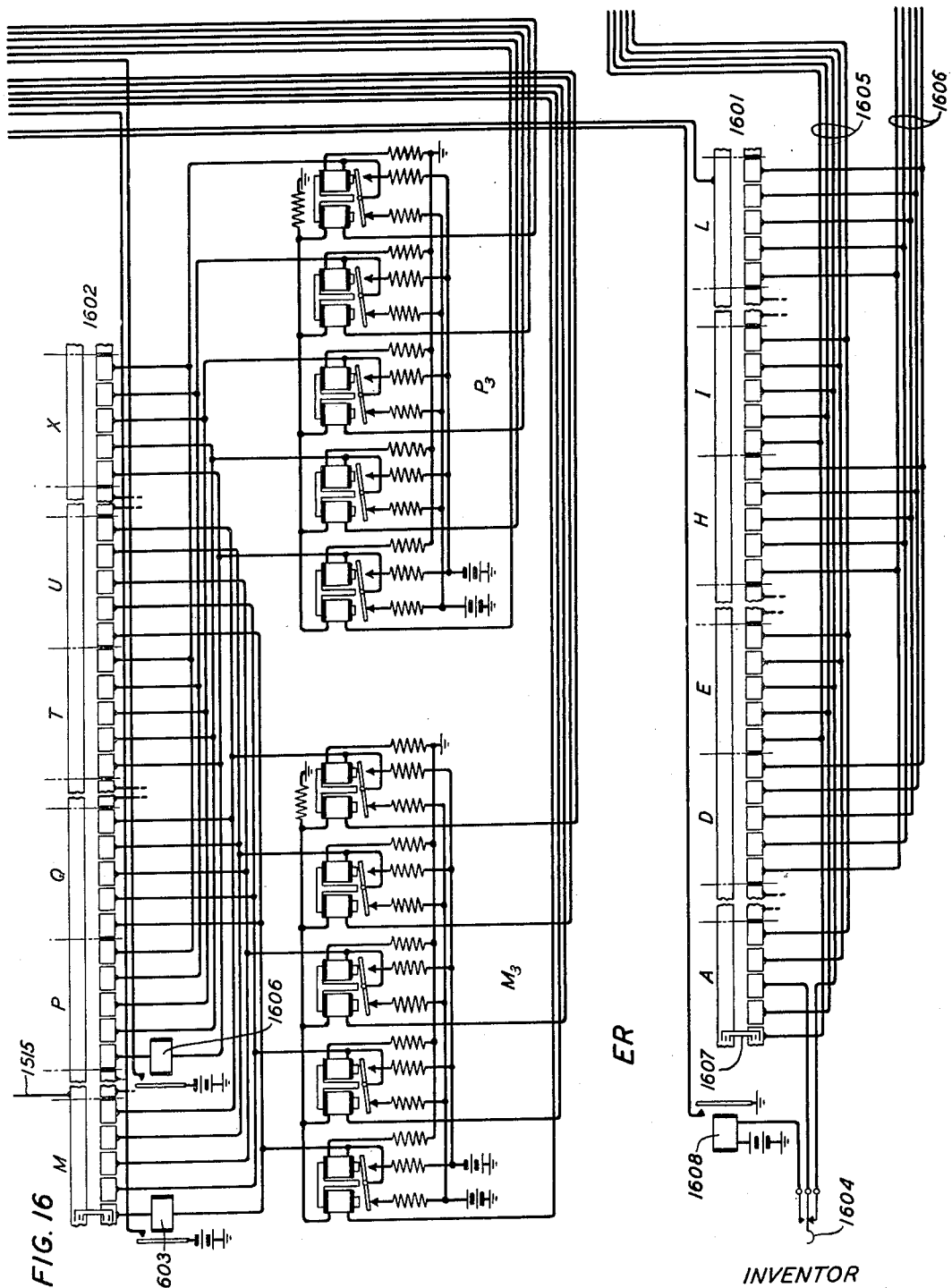

Fig. 16 shows the east-west sending ring set and the west-east receiving ring set of the twelve-channel multiplex rotary distributor, one set of storing relays being shown provided for each group of three channels on the sending ring set.

Figure 17:
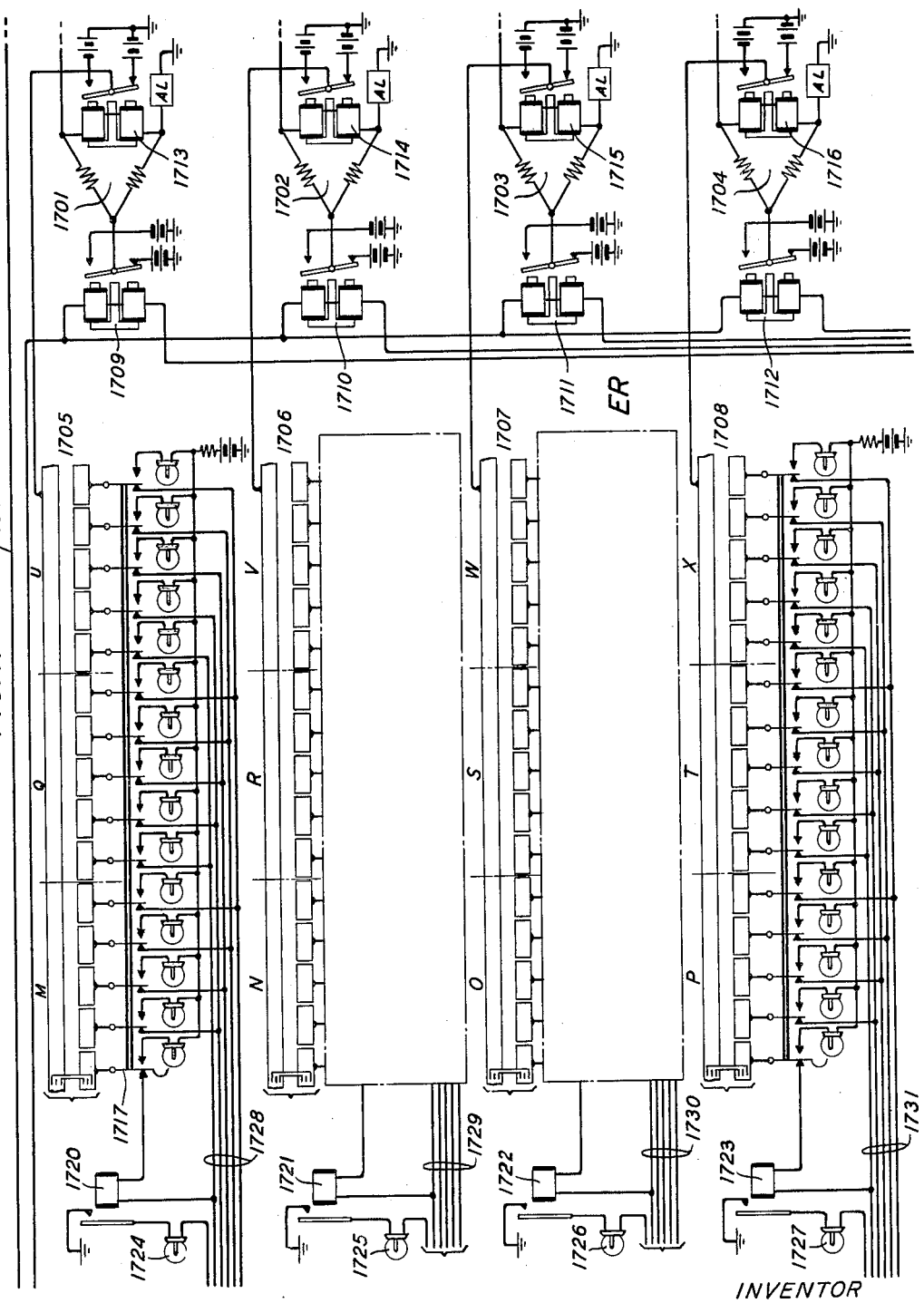

Fig. 17 shows the receiving ring sets of the four three-channel multiplex rotary distributors for east-west transmission, each distributor being connected to a duplex line.

Figure 18:
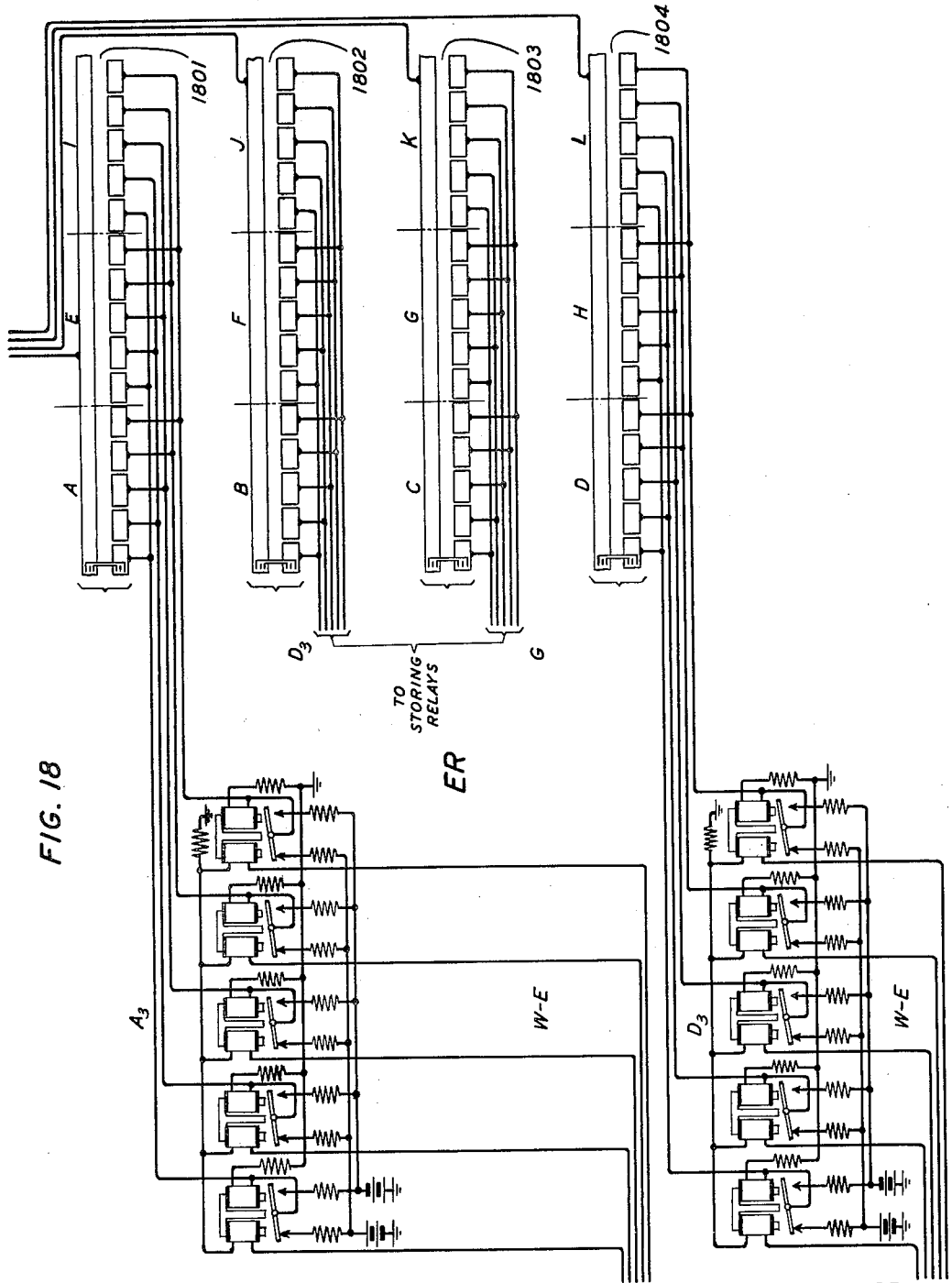

Fig. 18 shows the sending ring sets of the four three-channel multiplex rotary distributors for west-east transmission and a set of storing relays for each ring set.

Figure 19:
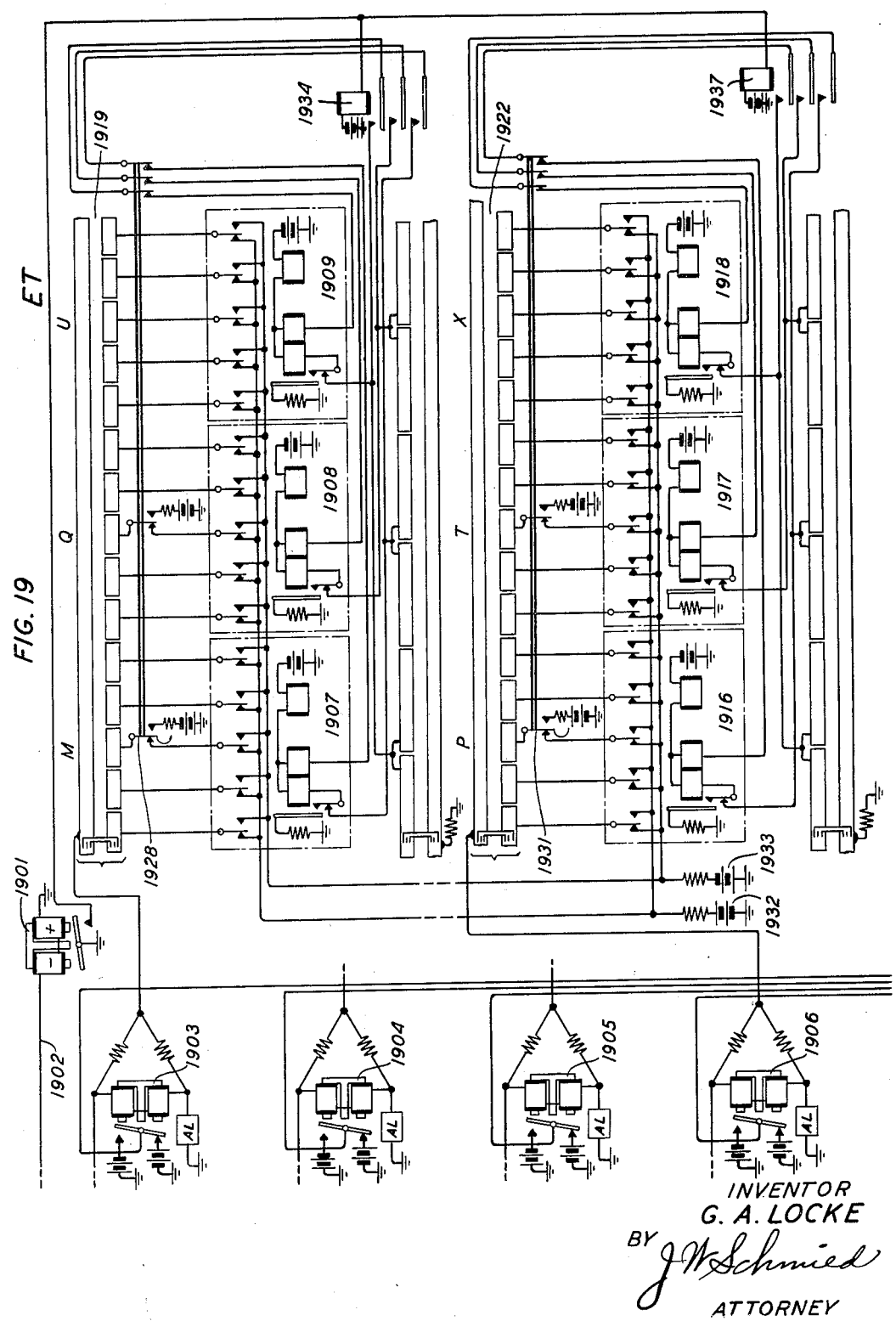

Fig. 19 shows the four multiplex duplex lines respectively connected at station ET through the sending ring sets of the four three-channel rotary distributors to four groups of three tape transmitters for east-west transmission.

Fig. 20 shows the receiving ring sets of the three-channel multiplex distributors and printer sets associated therewith, arranged to be operated in west-east transmission from the duplex lines shown in Fig. 19.

DESCRIPTION OF SCHEMATIC LAY-OUT

Figure 4:
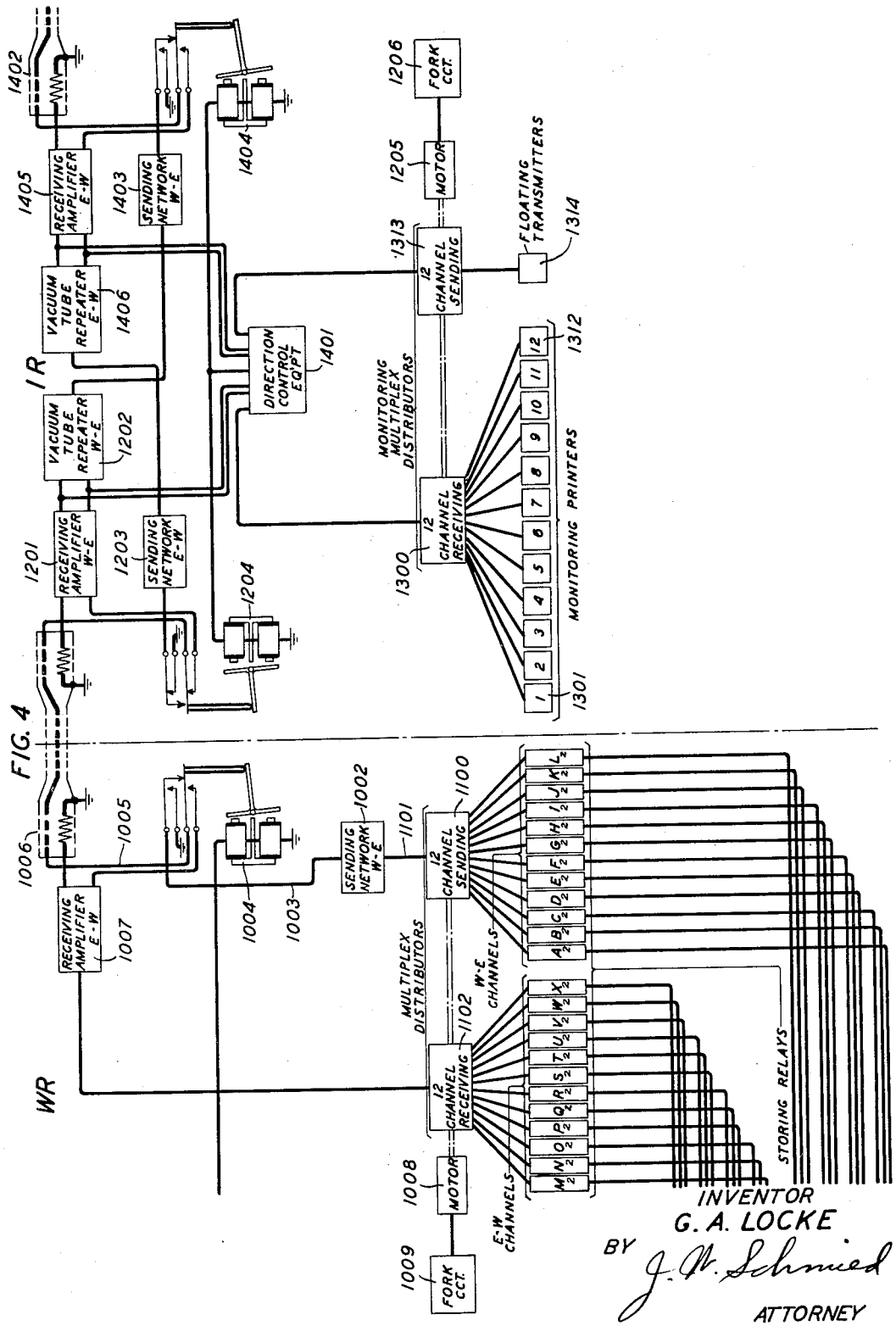
Figure 5:
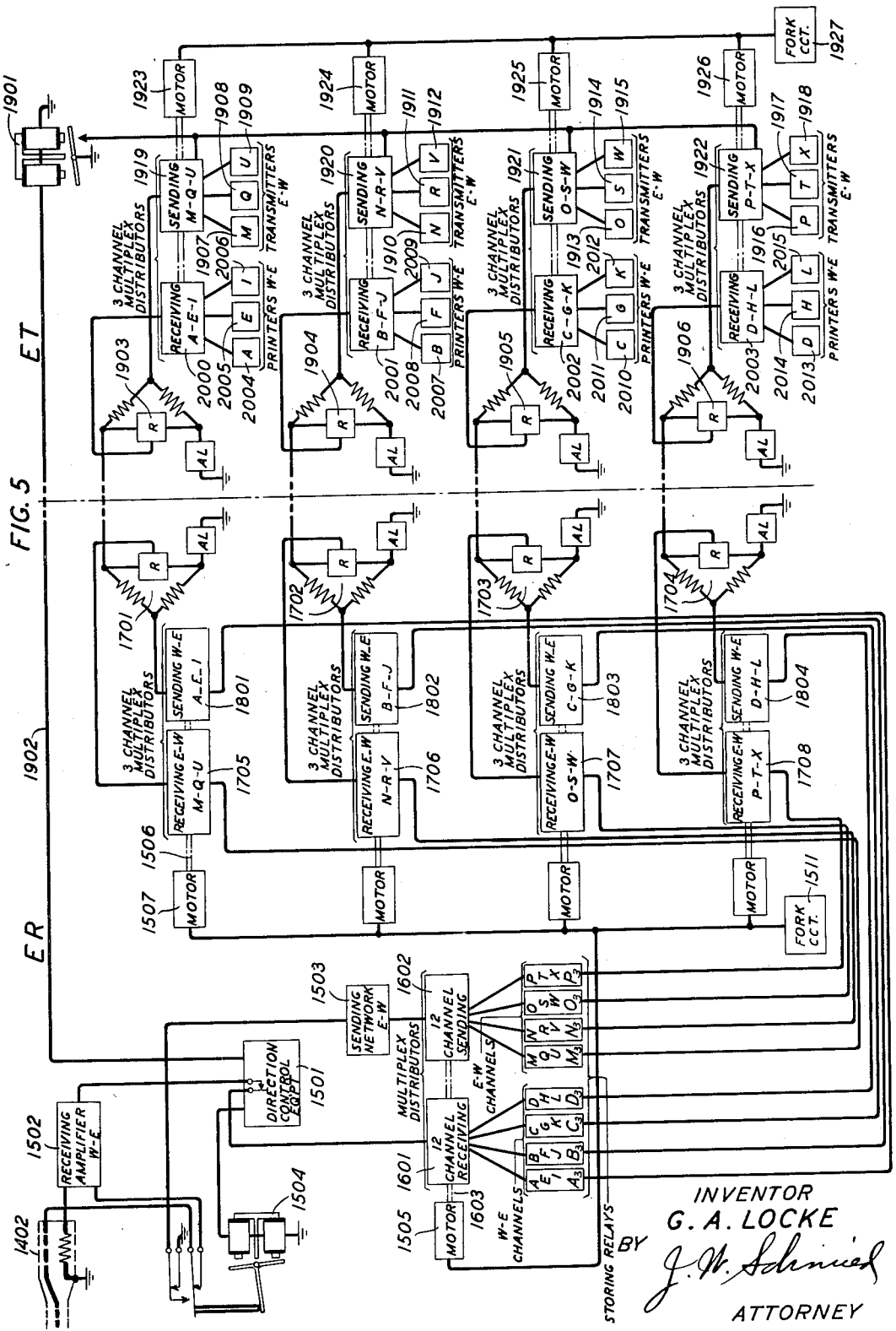

The schematic drawings of Figs. 3, 4 and 5 set forth the inter-relation of the elements of the system briefly described above. The system is arranged to automatically change its direction of transmission at predetermined intervals. Assume that the system is set in a position for west-east transmission as shown. This setting is accomplished by the continuously operating cams of the direction control equipment shown diagrammatically by blocks 1011, 1401 and 1501 at the cable receiving stations WR, IR, and ER respectively. The direction control switches at the terminal stations WT and ET are controlled from repeating stations WR and ER respectively. Relay 601 serves as the direction control switch at station WT and is controlled over pilot line 602 from the equipment in block 1001 at station WR. Relay 1901 is the direction control switch at station ET and is operated over pilot line 1902 by the equipment in block 1501 at station ER. The directional control equipment is described in detail in U. S. Patent 1,681,489, to G. A. Locke et al., August 21, 1928.

West terminal station

The twelve tape transmitters 603 to 614 inclusive are respectively connected through the sending heads A to L of twelve start-stop distributors, over the twelve conductors 615 to 626 inclusive to twelve duplex lines 627 to 638 inclusive.

When transmission is in the opposite direction, that is east to west, the duplex lines by means of their respectively associated receiving relays 639 to 650 inclusive, repeat the incoming signals over conductors 651 to 662, to the receiving heads M to X inclusive, of the twelve start-stop distributors to the twelve printers 701 to 712. The twelve start-stop distributors have their sending and their receiving heads mounted on a common shaft 675 which is driven by motor 713.

The operation of the start-stop transmitting and receiving apparatus is described in detail in U. S. Patent 1,380,679 granted to P. M. Rainey on June 7, 1921.

West repeater station

The signal impulses transmitted by transmitters 603 to 614 are received at station WR and repeated by receiving relays 801 to 812 inclusive, over the conductors 813 to 824, the contacts on the cams of the direction control equipment 1001, conductors 825 to 836, to the receiving heads $A_1$ to $L_1$ of twelve start-stop distributors at this station. Each of the receiving heads $A_1$ to $L_1$ distributes its group of signals to a set of storing relays, such as $A_2$, $D_2$, $C_2$, etc. At the completion of each revolution of the receiving heads of the start-stop distributors, the stored impulses are repeated in turn over a twelve-channel multiplex sending distributor ring set 1100. In other words the impulses stored in relay set $A_2$ are transmitted, then the impulses stored in relay set $B_2$, and so on until all relay sets have been connected to the sending ring set 1100 by the rotating brush thereof. The means of storing the impulses, repeating them over a multiplex distributor and preventing overlap between successive groups of impulses on any one set of storing relays are described in detail in U. S. Patent 1,549,820 granted to G. S. Vernam on August 18, 1925. The impulses repeated through ring set 1100 are impressed on conductor 1101, sending network 1002, conductor 1003, middle contact of transfer relay 1004 (positioned for west-east transmission by the direction control equipment 1001), conductor 1005 and the cable 1006 for transmission to station IR. The function of the sending network 1002 is described in U. S. Patent 1,624,394 granted to A. M. Curtis on April 12, 1927.

When the transfer relay 1004 is positioned for east-west transmission the signal impulses incoming on cable 1006 at station WR are received in a shaping and receiving amplifier 1007 of the type disclosed in U. S. Patent 1,673,042 granted to A. M. Curtis on June 12, 1928, and then impressed on a twelve-channel multiplex receiving distributor ring set 1102 whereby they are distributed in groups to twelve sets, $M_2$ to $X_2$ inclusive, of storing relays. The impulses are repeated by the twelve sets of storing relays to twelve sending heads, $M_1$ to $X_1$ inclusive, of the start-stop distributors at station WR.

The means of storing the impulses and repeating them over a multiplex distributor are described in detail in the Vernam Patent 1,549,820, supra. The sending heads $M_1$ to $X_1$ respectively distribute twelve groups of signal impulses over conductors 901 to 912 to the twelve duplex lines 627 to 638. The twelve receiving heads $A_1$ to $L_1$ and the twelve sending heads $M_1$ to $X_1$ are mounted on a common rotating shaft 837 which is driven by motor 913. The sending ring set 1100 and the receiving ring set 1102 of the twelve channel multiplex distributor are driven from motor 1008 of the La Cour type which in turn is operated by the tuning fork circuit 1009. It is desirable also that motor 913 be also controlled by fork 1009 as well as motor 1008.

The intermediate repeater station

The signals incoming on cable 1006 at station IR during west-east transmission are amplified and reshaped by receiving amplifier 1201. The shaping and amplifying means are the same as those described in Curtis Patent 1,673,042, supra.

The equipment at station IR is provided with means for terminating or dropping off one or more channels and for utilizing the corresponding channel or channels on the outgoing cable 1402 in west-east transmission, for transmitting new messages which originate at this station. The amplified signals are impressed on a twelve-channel multiplex monitoring distributing ring set 1300 and thereby distributed to twelve monitoring printer sets 1301 to 1312 inclusive. The means for terminating one or more channels at this station comprise a twelve-channel multiplex sending distributor ring set 1313 to which is operatively associated one or more transmitters such as 1314, which are arranged to be connected to any one or more of the channels and for this reason are referred to herein as floating transmitters. Although only one floating transmitter is shown it is understood that additional transmitters may be provided, each equipped with a five point plug for engaging a five point jack connected to any channel group of segments on ring set 1313.

When it is desired to terminate a channel the sending ring set 1313 is connected by a switch (not shown in the schematic lay-out but designated 1211 in Fig. 12) through the contacts of the direction control equipment 1401 to the input circuit of the west-east vacuum tube repeater 1202, and the impulses transmitted from one of the floating transmitters 1314 predominate in the input circuit of repeater 1202 over the signal impulses received from the cable 1006 over the channel which is selected for termination. This predomination of the locally transmitted signals suppresses the incoming signals of the selected channel and permits the locally transmitted signals to pass through the repeater 1202, sending network 1403, over the middle contacts of transfer relay 1404 to the cable 1402.

Signal impulses incoming on cable 1402 at station IR, during east-west transmission, are amplified and reshaped by amplifier 1405 in the manner described in Curtis Patent 1,673,042, supra. The amplified signals are distributed over the twelve-channel multiplex monitoring ring set 1300 to their respective monitoring printers 1301 to 1312. Likewise the floating transmitters 1314, etc. may be connected to the segments on any channel of the multiplex sending ring set 1313, that is selected for termination at station IR. East-west transmission of these locally transmitted signals will in the manner stated above predominate over the signals incoming on the selected channel, which results in suppressing the signals incoming on the selected channel and allowing the locally transmitted signals to pass through east-west vacuum tube repeater 1406, sending network 1203, over the middle contacts of transfer relay 1204 to the cable 1006. With this arrangement the twelve-channel multiplex monitoring ring set 1300, the sending ring set 1313 and the floating transmitters 1314, etc., are made common to transmission in both directions by means of the switching cams of the direction control equipment 1401. However, a separate vacuum tube repeater, a separate receiving amplifier and a separate sending network is required for each direction of transmission. The ring sets 1300 and 1313 are driven by a common shaft which is turn is driven from a La Cour type motor 1205 which is operated from a tuning fork circuit 1206. The vacuum tube repeaters arranged to terminate certain channels and adapted for use at this station are of the type disclosed in the A. A. Clokey et al. U. S. Patent 1,823,088, Sept. 15, 1931.

East repeater station

The signals incoming on cable 1402 at the east repeater station ER are amplified and reshaped by amplifier 1502, and the amplified signals are then impressed by means of the contacts of the direction control equipment 1501 on to a twelve-channel multiplex receiving distributor ring set 1601. The signals received by the twelve channels are divided into four groups of channels, namely, A, E and I; B, F and J; C, G and K; and D, H and L; these groups are respectively impressed on four groups $A_3$, $B_3$, $C_3$ and $D_3$ of storing relays which store and repeat the signals to four three-channel multiplex sending distributor ring sets 1801, 1802, 1803 and 1804 respectively.

The storing relays suitably adapted for use at this station are of the type shown in Fig. 8 of the drawings of the A. D. Dowd et al. Patent 1,823,354, supra, and described therein. The three-channel sending ring sets are respectively connected to four duplex lines 1701 to 1704 inclusive.

In repeating signals received at station ER, over duplex lines 1701 to 1704 inclusive, the signals from the four lines are impressed on four three-channel multiplex receiving distributor ring sets 1705 to 1708 inclusive. These receiving ring sets are respectively connected to four groups of storing relays $M_3$, $N_3$, $O_3$ and $P_3$ whereby the signal impulses of the three channels in each of the four groups are successively stored and then repeated through a twelve-channel multiplex sending distributor ring set 1602, sending network 1503, middle contacts of transfer relay 1504 to the cable 1402. The four signal groups of three channels each are selected successively by the rotating brush of distributor ring set 1602. The receiving ring set 1601 and the sending ring set 1602 of the twelve-channel multiplex distributor are driven by a common shaft 1603 (Fig. 5) which is connected to a fork driven motor 1505. The sending and receiving ring sets of the four three-channel multiplex distributors are connected in pairs which are respectively driven by common shafts. The shafts of the four three-channel multiplex distributors are driven by separate motors, for example, receiving ring set 1705 and sending ring set 1801 are driven by the shaft 1506, which in turn is driven by motor 1507. The motors for the four three-channel distributors and the one twelve-channel distributor at this station are driven by a single fork circuit 1511. All motors used at this station are of the La Cour type.

East terminal station

The signals incoming over the four duplex lines 1701 to 1704 at station ET are received by relays 1903 to 1906 inclusive. These relays reproduce the incoming signals and respectively impress them on the four three-channel multiplex receiving distributor ring sets 2000 to 2003 inclusive. The channels A, E, I are received over duplex line 1701 and are respectively terminated in printers 2004, 2005 and 2006, and in like manner channels B, F and J are received over duplex line 1702 and terminated in printers 2007, 2008 and 2009, channels C, G and K are received over duplex line 1703 and terminated in printers 2010, 2011, and 2012, and channels D, H and L are received over duplex line 1704 and terminate in printers 2013, 2014 and 2015. In this way transmitters 603 to 614 inclusive at station WT are connected over channels A to L to printers 2004 to 2015 respectively at station ET.

In east-west transmission the signals originating at station ET at transmitters 1907 to 1918 inclusive, are transmitted over the four three-channel multiplex sending distributor ring sets 1919 to 1922 to the duplex lines 1701, 1702, 1703 and 1704 in the manner shown, the channels being accordingly divided into four groups, namely, M, Q and U; N, R and V; O, S and W; and P, T and X. Thus, transmitters 1907 to 1918 at station ET are respectively connected over channels M to X inclusive to printers 701 to 712 at station WT.

The receiving distributor ring sets 2000, 2001, 2002 and 2003 are respectively paired with the sending distributor heads 1919, 1920, 1921 and 1922 and each pair is driven by a separate motor, such as 1923, 1924, 1925 and 1926, all the motors being driven by a common fork circuit 1927.

OPERATION OF SYSTEM

The operation of the system is described with reference to the detailed lay-out shown in Figs. 6 to 20, inclusive. The signal code employed in modern submarine telegraphy is the "Baudot" or five impulse code, and the transmitters 603 to 614 inclusive at station WT and 1907 to 1918 inclusive at station ET represent the type adapted to send this type of code. All the transmitters employed herein are of the tape-operated type.

PREPARATORY ADJUSTMENT-STARTING

In preparing the system for transmission after a period of non-use, a series of adjustments are made with timed intervals allowed for each adjustment. Assume that the direction of transmission is to be first in a west-east direction, the attendant at station WT sends a Morse code signal which is repeated to each of the attendants at the other stations successively, instructing them to start their motors at their respective stations. The Morse code equipment is not shown herein but may be provided in a manner described in Curtis U. S. Patent, 1,689,328, issued October 30, 1928.

The attendants at stations WR, IR and ER, after receiving the Morse signal which contains the information regarding the proper ratio of east and west transmission time that is to be used, start their motors, such as motor 1008 at station WR, 1205 at station IR and 1505 at station ER.

The operation of motor 1008 at station WR starts the brushes rotating over the respective ring sets of the multiplex distributor which comprises the sending ring set 1100, receiving ring set 1102, the ring set 1104 (effective to operate during east-west transmission the sending start-stop distributors shown in Fig. 9, but non-effective during west-east transmission) and the ring set for the continuous electrical corrector and the vibrating relay circuits respectively included in the blocks 1013 and 1014 which are diagrammatically shown.

The operation of motor 1205 at station IR starts the brushes rotating over the monitoring ring set 1300, the sending ring set 1313 and the local brush ring sets 1316 and 1317, which serve to provide a sixth pulse for the proper operation of printers 1301 to 1312 and transmitter 1314 respectively. The operation of motor 1505 at station ER starts the brushes rotating over the respective ring sets of the multiplex distributor which comprises the sending ring set 1602 and receiving ring set 1601.

When all three stations have completed the starting of their motors it is necessary for stations IR and ER to adjust the speed and phase of their distributors. This is accomplished at station WR by operating a key, not shown, which sends a special phasing signal over the cable to station IR and through the repeater at station IR to station ER. Stations IR and ER then adjust their speed and phase, using a phasing means which is described in the A. D. Dowd et al. Patent 1,823,354, supra. When the stations IR and ER have completed the phasing operation, station IR operates key 1315 to its alternate position and station ER operates key 1604 to its alternate position. Station WR, which has been started by this time, allows sufficient time to elapse for the above operation and then operates key 1103. The operation of key 1103 prepares a circuit from battery through relay 1106, movable member of key 1103 to the third segment of the sending ring set 1100, and when the brush passes over this third segment the circuit is completed through conductors 1101 and 1003, middle contacts of relay 1004 to the sea earth at the distant end of cable 1006. This operation accomplishes two things. It operates relay 1106 and sends a signal over the cable which is opposite in polarity to that normally transmitted from the third segment. The opposite polarity is received at station IR on the third receiving segment of ring set 1300 and operates relay 1318, the same signal is also received at station ER on the third receiving segment of ring set 1601 and operates relay 1608. Thus relays 1106, 1318 and 1608 are operated practically simultaneously except for the lag of the line. Relay 1106 when it operates energizes clutch release magnet 1010, relay 1318 energizes clutch release magnet 1407 and relay 1608 actuates clutch release magnet 1512 and the timing circuits of a type which are shown in detail in the A. D. Dowd et al. Patent 1,823,354, supra, are set in motion at all three stations. When the predetermined time has elapsed the direction of transmission will be automatically changed to east-west and the phasing operation will again take place in the east-west direction and the correcting rings at stations IR and WR will be adjusted as described in Locke U. S. Patent 1,717,049, issued June 11, 1929. This part of the lining-up procedure takes care of the cable part of the circuit without reference to stations WT and ET.

Station WT is now applied to the circuit simply by starting the motor 713 at station WT and the motor 913 at station WR. Station ET is now applied to the circuit by starting the motors 1507, 1508, 1509 and 1510 at station ER and the motors 1923, 1924, 1925 and 1926, which are shown in Fig. 5 only, are started from a common fork circuit 1927. The sending ring sets 1801, 1802, 1803 and 1804 must next be phased with the receiving ring set 1601, and the receiving ring sets 1705, 1706, 1707 and 1708 must be phased with the sending ring set 1602. If the correct phase relation is had the impulse repeated by the first energized or operated storing relay of each of groups $M_3$, $N_3$, $O_3$ and $P_3$ will operate one of the relays 1603 to 1606 to thereby connect battery to ground at one of the associated indicating relays 1720 to 1723. Only relays 1603 and 1606 are shown but it is understood that relays 1604 and 1605 are similarly connected to the first segments of channels N and O, respectively, which are not shown. The simultaneous operation of each of the indicating relays with one of relays 1603 to 1606 causes one of the lamps 1724 to 1727 to flash to thereby give an indication of the correct phase relation, the operation of the indicating relays being of longer duration than that of the storing relays to insure the closing of the circuit. If any one or all of the lamps 1724 to 1727 fail to flash, any one of the ring sets 1705 to 1708 or all may be oriented sufficiently in either direction until all lamps flash on every revolution of the brushes rotating over these ring sets.

Then station ET is phased by sending phasing signals from station ER to station ET and from station ET back to station ER to operate a series of lamps in a manner described in the A. A. Clokey Patent 1,799,214, supra.

TRANSMISSION OF LETTER CODE

*West-east direction*

To further elucidate the operation, let it be assumed that station WT is transmitting. Accordingly the direction control equipment 1001 has caused relay 601 to operate to the position shown so that the tape transmitters 603 to 614 at station WT are in readiness to be operated as desired. The start-stop distributors designated A to L inclusive to correspond to the twelve west-east channels, are respectively associated with the transmitters. Any transmitters may be selected for operation by feeding tape from a perforator (not shown) which tape automatically operates the transmitter along as is well known in the art. If at any time a start-stop distributor catches up with the perforated tape the locking circuit such as that shown for relay 663 is opened by the tape pulling taut against contact 666 which opens the operating circuit of magnet 664, thereby stopping the brush arm 665 by the release of magnet 664.

The signals transmitted through the start-stop distributors are repeated by sending-on relays such as relays 667 to 678, over the duplex line 627 to 638.

West terminal station

Assume that the letters J and L are the next letters to be respectively transmitted over channels A and B, the tape of transmitter 603 will be punched so that the first, second and fourth tongues of transmitter 603 and the second and fifth tongues of transmitter 604 close their respective contacts to marking polarity, and the third and fifth tongues of transmitter 603 and the first, third and fourth tongues of transmitter 604 close their spacing or normal contact. The impulses of spacing and marking polarity are transmitted over the start-stop distributors A and B to operate accordingly each of the sending-on relays 667 and 668. Sending-on relay 667 reproduces over line 627, two negative, one positive, one negative and one positive impulses for channel A and the sending-on relay 668 reproduces over line 628, one positive, one negative, two positive and one negative impulses for channel B.

West repeater station

The impulses transmitted over line 627 are respectively reproduced at station WR by relay 801 as two "current", one "no current", one "current" and one "no current" impulses and those transmitted over line 628 are respectively reproduced by relay 802 as one "no current", one "current", two "no current" and one "current" impulses, there being, of course, transmitted with each group of five impulses over lines 627 and 628 a "start" impulse of positive polarity which start impulses are repeated by relays 801 and 802 respectively, as impulses of "no current"; and a "stop" impulse of negative polarity which are repeated by relays 801 and 802 respectively as "current" impulses to correspond to the seven impulses required for each signal or character transmitted by start-stop distributors. The "start" impulses repeated by relays 801 and 802 respectively cause the release of relays 850 and 851 which in turn cause the brushes of distributor ring sets A₁ and B₁ to begin rotating. The five signal impulses of "current" and "no current" reproduced by relay 801 are repeated by relay 850 over distributor A₁, conductors 852, through the upper windings of the relays in the upper row of relay set A₂ and the first, second and fourth relays in this row operate in response to the "current" impulses, the third and fifth relays remaining normal because of the "no current" impulses being received by them. Likewise the five signal impulses of "current" and "no current" impulses reproduced by relay 802 are repeated by relay 851 over distributor B₁, conductors 853, through the upper windings of the relays in the upper row of relay sets B₂, shown diagrammatically, and the second and fifth relays in the upper row operate in response to the "current" impulses, the first, third and fourth relays remaining normal because of the "no current" impulses being received by them.

When brush 1105 passes over the segments of channel A on ring set 1100, the operated and normal condition of the relays in the upper row of relay sets A₂ causes to be transmitted over conductors 1101 and 1003 to the cable 1006, two negatives, one positive, one negative and one positive impulses which correspond to the combination for the letter J as originally transmitted. Likewise when brush 1105 passes over the channel B segments of ring 1100 the operated and normal condition of the relays in the upper row of relay set B₂ causes to be transmitted to the cable, one negative, one positive, two negative and one positive impulses, it being noted here that the polarity of the spacing and marking impulses repeated by relay set B₂, are reversed as shown in relay set L₂ in accordance with the practice of reversing the polarity of spacing impulses in alternate channels when signaling over an even number of channels on a submarine telegraph cable.

Intermediate repeater station

The signals received over channels A and B on cable 1006 are transmitted through the amplifier 1201, the vacuum tube repeater 1202, over conductor 1207, through the cable 1402 without reproducing new signals. The vacuum tube repeater circuit 1202 comprises a monitor relay 1208 which repeats all incoming signals to a vibrating relay circuit 1209. The vibrating relay circuit repeats the incoming impulses and interpolates those impulses which are lost during transmission over the cable 1006, for distribution over the twelve-channel monitor distributor ring sets 1300 to a group of twelve printer sets 1301, 1302, 1303 etc. The vacuum tube repeater circuit also comprises means for utilizing the incoming impulses for operating a continuous electrical corrector circuit shown diagrammatically by blocks 1210, whereby synchronism between the monitor ring set and the signal impulses incoming over cable 1006 at station IR is maintained. Another element of the vacuum tube repeater circuit is the floating transmitter 1314 for terminating at this station any one of the incoming channels. This transmitter may be connected to any one of the twelve channels on a sending ring set 1313 which is selected for termination, for the purpose of transmitting new signals over the corresponding channel on cable 1402. The signals transmitted by transmitter 1314 are of sufficient strength to suppress those incoming over the selected channel on cable 1006. By employing two or more floating transmitters two or more incoming channels may be terminated at station IR.

To terminate channel B, for example, at station IR, the switch 1211 would be closed and the transmitter 1314 would be temporarily connected to the segments of the corresponding channel on ring sets 1313 as shown. The new signal impulses transmitted by transmitter 1314 would be impressed on the input of the vacuum tube repeater circuit 1202 simultaneously with the signals received over channel B from the cable 1006, and the locally transmitted signals would predominate thereby suppressing the incoming signals of channel B. This operation is described in detail in Clokey et al. Patent 1,823,088, supra. However, for the purpose of this description it is assumed that no channels are terminated at station IR and therefore the signals as originally transmitted over channels A and B are repeated directly through station IR.

A suitable vibrating relay circuit is disclosed in U. S. Patent 1,680,550, granted to M. B. Kerr, granted on August 14, 1928. For a suitable continuous electrical corrector circuit reference may be had to a copending application of W. A. Knoop, Serial No. 354,954, filed April 13, 1929 issued as Patent No. 1,848,180, March 8, 1932.

East repeater station

The signal impulses incoming over cable 1402 at station ER are amplified and subsequently impressed on the continuous electrical corrector circuit 1518 and the vibrating relay circuit 1519 whereby the twelve-channel multiplex distributors at station ER are synchronized with the incoming signals and the incoming signal impulses are reproduced and the signal impulses lost during transmission are interpolated. The signal impulses reproduced by the vibrating relay circuit are distributed over the channels A and B, segments of ring set 1601, the segments of channel B not being shown. The impulses distributed over the channel A segments are impressed over conductors 1605, through the left hand windings of the relays of storing relay sets $A_3$, to ground. Conductors 1605 are common to channels A, E and I and conductors 1606 are common to channels D, H and L, there being two other groups of conductors (not shown) which are respectively common to the two groups of channels B, F and J and C, G and K.

When brush 1607 passes over the segments of channel A, the first, second and fourth relays of storing relay set $A_3$ operate and thereby reproduce a signal composed of two negative, one positive, one negative and one positive impulses which are distributed over the first five segments (channel A) of ring set 1801 to the sending-on relay 1709. When brush 1607 passes over the segments of channel B the first, third and fourth relays of storing relay set $B_3$ operate and thereby reproduce a signal composed of one negative, one positive, two negatives and one positive impulses which are now opposite in polarity to those originally transmitted from station WT over channel B and these reproduced impulses are distributed over the first five segments (channel B) of ring set 1802 to sending-on relay 1710. Likewise signal impulses on channel C will be reproduced in storing relay set $C_3$ and distributed over the first five segments (channel C) of ring set 1803 to sending-on relay 1711 and those on channel D will be reproduced in storing relay set $D_3$ and distributed over the first five segments (channel D) of ring set 1804 to sending-on relay 1712. Storing relay sets $B_3$ and $C_3$ are not shown. Transmission over the remaining channel is as follows: Channels E and I, the same as channel A; F and J, the same as B; G and K, the same as C, and H and L, the same as D.

East terminal station

Relay 1709 reproduces the group of impulses of channel A and relay 1710 reproduces the group of impulses of channel B for transmission over lines 1701 and 1702 respectively. These groups of impulses are received at station ET by receiving relays 1903 and 1904 which reproduce them in the same polarity as they are received from the line for transmission through the ring sets 2000 and 2001 (the latter not shown). When brush 2024 passes over the first five segments (channel A) the segments successively receive two negatives, one positive, one negative and one positive impulses thereby causing the operation of the first, second and fourth selector magnets of printer 2004, the magnets of which are connected to grounded positive battery 2025. Thus the letter J is recorded. When the brush (not shown) passes over the first five segments (channel B) of ring set 2001 (not shown) the segments successively receive one negative, one positive, two negative and one positive impulses thereby causing the operation of the second and fifth selector magnets of the first printer associated with ring set 2001, the magnets of which are connected to grounded negative battery 2026. Thus the letter L is recorded. It is understood that the magnets of the printer sets associated with ring sets 2000 and 2002 are connected to positive battery 2025 and the magnets of the printer sets associated with ring sets 2001 and 2003 are connected to negative battery 2026. The purpose of the negative battery 2026 is to operate the printer magnets of the even numbered channels in the same manner as would have been done if the polarity of the spacing impulses on the even numbered channels had not been reversed for transmission over the cable sections.

EAST-WEST DIRECTION

East terminal station

At the end of a predetermined interval the timing circuit 1011 of station WR, 1408 of station IR, and 1513 of station ER, effect closures of circuits for operating the direction control equipment 1001, 1401 and 1501 respectively, for a period of say six seconds. During this short period the cams which are provided with each of the equipment, transfer the apparatus at each station from transmission in a west-east direction to transmission in an east-west direction. By means of relay 1901 at station ET, relays 1934 to 1937 inclusive are operated and the transmitters 1907 to 1918 are connected for the transmission of signals in an east-west direction over the duplex lines 1701 to 1704 inclusive, the connection being established through four three-channel multiplex distributors 1919 to 1922. The spacing contact of transmitters 1907, 1908, 1909, 1913, 1914 and 1915 (the last three not shown) are connected to grounded positive battery 1932 and the spacing contact of transmitters 1910, 1911, 1912, 1916, 1917 and 1918 (the first three not shown) are connected to grounded negative battery 1933. These arrangements provide for reversing the polarity of the signal impulses at the end of each channel in east-west transmission over the cable sections.

East repeater station

The impulses incoming over the duplex lines 1701 to 1704 inclusive are repeated by receiving relays 1713 to 1716, through four three-channel multiplex receiving ring sets 1705 to 1708, over groups 1728 to 1731 of conductors, to four sets $M_3$ $N_3$, $O_3$ and $P_3$ of storing relays (sets $N_3$ and $O_3$ not shown). The signals stored on relay sets $M_3$, $N_3$, $O_3$ and $P_3$ are successively distributed over a twelve-channel multiplex sending distributor ring set 1602, and impressed on conductor 1515 through the sending network 1503 and over conductor 1516, middle contacts of transfer relay 1504, now in its alternate position, to the cable 1402.

Intermediate repeater station

Signal impulses incoming on cable 1402 of station IR are received over the lower contacts of transfer relay 1404 and impressed on a reshaping and amplifier circuit 1405 wherein the impulses are reshaped, amplified and then impressed on a vacuum tube repeater circuit 1406. The vacuum tube repeater circuit comprises a monitor relay 1410 which is arranged to repeat all incoming impulses to the vibrating relay circuit 1209 which in turn is effective to repeat the incoming signals and interpolate those lost during transmission in an east-west direction over cable 1402, for distribution over the monitor distributor ring set 1300 to twelve printer sets 1301 to 1312 inclusive whereby all incoming channels are monitored. The vacuum tube repeater circuit also comprises a switch 1411 which is adapted when closed to connect the floating transmitter 1314 through a twelve-channel distributor ring set 1313 to the input circuit of the repeater circuit 1406 whereby the impulses transmitted by transmitter 1314 are of sufficient strength to suppress the impulses on the corresponding channel incoming over cable 1402. The vacuum tube repeater circuit 1406 also comprises means for connecting the continuous electrical corrector circuit 1210 in order that the twelve-channel distributor ring sets 1300, 1313, 1316 and 1317 may be maintained in synchronism with the impulses incoming over cable 1402. It will be noted that the vibrating relay circuit 1209, the continuous corrector circuit 1210, the monitor printer sets 1301 to 1312 inclusive and the floating transmitter 1314 are common to transmission in both directions. The output of vacuum tube repeater 1406 is impressed on conductor 1412 through the sending network 1203, over the middle contacts of transfer relay 1204 to the cable 1006.

West repeater station

The impulses incoming over cable 1006 at station WR are received over the lower contacts of transfer relay 1004 and impressed on the reshaping and amplifying circuit 1007 wherein they are reshaped and amplified for further transmission through the windings of signal relays 1015 whereby they are repeated for the vibrating relay circuit 1014. The output of the reshaping and amplifying circuit 1007 is connected through a continuous electrical corrector circuit 1013 whereby the incoming impulses are utilized for maintaining the distributor ring sets 1100, 1102 and 1104 in synchronism with the twelve-channel multiplex distributors at station IR.

The vibrating relay circuit repeats the incoming impulses and interpolates those lost during transmission in an east-west direction over cable 1006, for transmission over conductors 1016, 1017, to the twelve-channel multiplex receiving distributor ring set 1102 whereby they are distributed over twelve groups of storing relays $M_2$ to $X_2$ inclusive. A twelve-channel ring set 1104 is provided on the same distributor head with the receiving ring set 1102 for the purpose of closing at the beginning of each channel an operating circuit for the release magnet of each of the start-stop distributors $M_1$ to $X_1$ inclusive. The impulses stored on the storing relay sets $M_2$ to $X_2$ are repeated in turns over the start-stop distributors $M_1$ to $X_1$ inclusive, to the sending-on relays 838 to 849 inclusive. The ring sets $M_1$ to $X_1$ are mounted on separate distributor heads of the start-stop type and these heads are mounted in parallel on the common shaft 837. The storing relay sets $M_2$ to $X_2$ which cooperate with the receiving ring sets $M_1$ to $X_1$ in repeating signals to the sending-on relays 838 to 849 inclusive, are arranged to respond to alternately opposite polarity. For example, relay set $M_2$ responds to negative marking impulses and relay set $N_2$ responds to positive marking impulses over the twelve-channel ring set 1102, and so on for the remaining relay sets $O_2$ to $X_2$. For a complete description of a multiplex distributor operating into a plurality of start-stop distributors through separate sets of storing relays, reference may be made to U. S. Patent 1,549,820, to Vernam, supra.

The sending-on relays 838 to 849 inclusive repeat polar signals over their respective duplex lines 627 to 638 inclusive to their respectively associated receiving relays 639 to 650 inclusive.

West terminal station

The receiving relays 639 to 650 repeat the incoming polar signals as impulses of "current" and "no current" through the receiving start-stop distributors M to X inclusive to their respectively associated printer sets 701 to 712 inclusive. Receiving start-stop distributors M to X inclusive are mounted in parallel to the sending start-stop distributors A to L inclusive on shaft 675. For a complete description of the operation of the start-stop distributors M to X reference may be made to U. S. Rainey Patent 1,400,493, supra.

Other provisions, such as circuits for correcting the signals for zero wander, as shown in U. S. Patent 1,689,328 granted to A. M. Curtis on October 30, 1928, may be added. The correction for synchronism for the four three-channel multiplex distributors of each of stations ER and ET may be had by using the mechanical corrector system disclosed in U. S. Patent 1,670,461 granted to G. A. Locke on May 22, 1928. Other details shown on the drawings, but which form no part of the present invention, are described in detail in the Patents 1,799,214 and 1,823,354, respectively granted to A. A. Clokey et al. and A. D. Dowd et al., supra.

What is claimed is:

1. An impulse transmission system comprising a plurality of terminal stations, a source of signal impulses at each of said terminal stations, a plurality of repeating stations, a high speed transmission circuit interconnecting said repeating stations in tandem, a plurality of low speed transmission circuits connecting each of said terminal stations to one of said repeating stations, a plurality of start-stop rotary distributors for respectively terminating certain of said low speed transmission circuits at one of said repeating stations, said distributors being mounted on a continuously rotating shaft common to said distributors.

2. An impulse transmission system, according to claim 1, wherein the low speed circuits at one of said terminal stations terminate in start-stop distributors, the low speed circuits at the other of said terminal stations terminate in multiplex distributors, the start-stop distributors at one of said terminal stations are mounted on a continuously rotating shaft common to said start-stop distributors and the multiplex distributors at the other of said terminal stations are respectively mounted on a plurality of shafts.

3. An impulse transmission system, according to claim 1, wherein signal impulses are transmitted at three different speeds, by employing a plurality of start-stop distributors at one terminal station for respectively operating over a plurality of channels at one speed, a multiplex distributor at each of the repeater stations for operating over said plurality of channels at another speed, and a plurality of multiplex distributors for respectively operating over groups of said plurality of channels at still another speed.

4. An impulse transmission system comprising a plurality of terminal stations and a plurality of repeater stations, a high speed transmission circuit connecting said repeater stations in series, a plurality of low speed circuits connecting each of said terminal stations to one of said repeater stations, a plurality of pairs of start-stop distributors at one of the end repeater stations, each pair respectively arranged to send and receive signals, for transmitting and receiving at one speed over a plurality of channels, a multiplex distributor at each of said repeater stations arranged to send and receive signals at another speed over said plurality of channels, and a plurality of multiplex distributors at the other end repeater station respectively arranged to send and receive signals at still another speed over groups of said plurality of channels.

5. An impulse transmission system according to claim 4, wherein the single multiplex distributor at one of said repeater stations is arranged to operate into a plurality of multiplex distributors for transmitting signals over a plurality of outgoing lines.

6. An impulse transmission system comprising a plurality of terminal stations, a plurality of repeating stations, a high speed transmission circuit interconnecting said repeating stations in tandem and terminating at each end in a multiplex distributor, a plurality of low speed circuits respectively connecting certain of said terminal stations to the repeating station at one end of the high speed transmission circuit, a plurality of other low speed transmission circuits respectively connecting the other of said terminal stations to the repeating station at the other end of the high speed transmission circuit, said low speed transmission circuits which are connected to one of the repeating stations being respectively terminated on start-stop distributors that are mounted on a continuously rotating shaft common to all the start-stop distributors and are arranged to transmit in turn the received messages over the said multiplex distributor to the high speed transmission circuit.

GEORGE A. LOCKE.